(12) United States Patent  (10) Patent No.: US 9,105,255 B2
Brown et al.  (45) Date of Patent: Aug. 11, 2015

(54) DISCRIMINATIVE CAPACITIVE TOUCH PANEL

(71) Applicant: SHARP KABUSHIKI KAISHA, Osaka (JP)

(72) Inventors: Christopher James Brown, Oxford (GB); Andrew Kay, Oxford (GB); Dauren Slamkul, London (GB)

(73) Assignee: SHARP KABUSHIKI KAISHA, Osaka (JP)

(*) Notice: Subject to any disclaimer, the term of this patent is extended or adjusted under 35 U.S.C. 154(b) by 17 days.

(21) Appl. No.: 14/135,639

(22) Filed: Dec. 20, 2013

(65) Prior Publication Data

US 2015/0179122 A1 Jun. 25, 2015

(51) Int. Cl.
*G06F 3/045* (2006.01)
*G09G 3/36* (2006.01)
*G06F 3/044* (2006.01)
*G06F 3/0488* (2013.01)
*G06F 3/041* (2006.01)

(52) U.S. Cl.
CPC .............. *G09G 3/3696* (2013.01); *G06F 3/044* (2013.01); *G06F 3/0416* (2013.01); *G06F 3/0488* (2013.01); *G09G 2300/0404* (2013.01); *G09G 2300/0426* (2013.01)

(58) Field of Classification Search
CPC ....... G06F 3/033; G06F 3/041; G06F 3/0416; G06F 3/044; G06F 3/047; G06F 3/0488; G06F 2203/04111; G01R 27/2605
See application file for complete search history.

(56) References Cited

U.S. PATENT DOCUMENTS

| 4,293,734 | A | 10/1981 | Pepper | |
|---|---|---|---|---|
| 7,663,607 | B2 | 2/2010 | Hotelling | |
| 8,892,397 | B1* | 11/2014 | Harding et al. | 702/158 |
| 8,976,124 | B1* | 3/2015 | Wright | 345/173 |
| 8,982,060 | B2* | 3/2015 | King et al. | 345/173 |
| 9,019,232 | B2* | 4/2015 | Kang et al. | 345/174 |
| 2004/0189617 | A1 | 9/2004 | Gerpheide | |

(Continued)

FOREIGN PATENT DOCUMENTS

JP  2012-068893  4/2012

OTHER PUBLICATIONS

U.S. Appl. No. 13/436,010, filed Mar. 30, 2012; cited on p. 17 of the specification.

(Continued)

*Primary Examiner* — Joe H Cheng
(74) *Attorney, Agent, or Firm* — Renner, Otto, Boisselle & Sklar, LLP.

(57) ABSTRACT

A mutual capacitance touch sensor includes a substrate, and an array of electrode elements formed on the substrate. Each electrode element includes at least one of a first electrode group having at least two drive electrodes and at least one sense electrode, or a second electrode group having at least two sense electrodes and at least one drive electrode. The respective electrodes of the first or second group are arranged to form multiple capacitances over different coupling distances. A controller is operatively coupled to the array of electrode elements, the controller configured to assign an input object as a conductive object when measurements of the multiple capacitances decrease as the input object approaches the touch sensor, and assign the input object as non-conductive object when measurements of at least one of the multiple capacitances increase as the input object approaches the touch sensor.

23 Claims, 25 Drawing Sheets

(56) References Cited

U.S. PATENT DOCUMENTS

| | | | |
|---|---|---|---|
| 2010/0149108 A1* | 6/2010 | Hotelling et al. | 345/173 |
| 2012/0050210 A1* | 3/2012 | King et al. | 345/174 |
| 2012/0056842 A1* | 3/2012 | Chang | 345/174 |
| 2012/0075243 A1 | 3/2012 | Doi et al. | |
| 2013/0033439 A1* | 2/2013 | Kim et al. | 345/173 |
| 2013/0100071 A1* | 4/2013 | Wright et al. | 345/174 |
| 2013/0257785 A1* | 10/2013 | Brown et al. | 345/174 |
| 2013/0257786 A1* | 10/2013 | Brown et al. | 345/174 |
| 2014/0009428 A1* | 1/2014 | Coulson et al. | 345/174 |
| 2014/0062933 A1* | 3/2014 | Coulson et al. | 345/174 |
| 2014/0062934 A1* | 3/2014 | Coulson et al. | 345/174 |
| 2015/0077383 A1* | 3/2015 | Kang et al. | 345/174 |

OTHER PUBLICATIONS

U.S. Appl. No. 13/541,423, filed Mar. 30, 2012; cited on p. 19 of the specification.

U.S. Appl. No. 13/435,898, filed Mar. 30, 2012; cited on p. 23 of the specification.

\* cited by examiner

DISCRIMINATIVE CAPACITIVE TOUCH PANEL

TECHNICAL FIELD AND APPLICATIONS OF THE INVENTION

The present invention relates generally to touch panel devices and, more particularly, to capacitive type touch panels. Such a capacitive type touch panel device may find application in a range of consumer electronic products including, for example, mobile phones, tablet and desktop PCs, electronic book readers and digital signage products.

BACKGROUND ART

Touch panels have recently become widely adopted as the input device for high-end portable electronic products such as smart-phones and tablet devices. Although, a number of different technologies can be used to create these touch panels, capacitive systems have proven to be the most popular due to their accuracy, durability and ability to detect touch input events with little or no activation force.

The most basic method of capacitive sensing for touch panels is the surface capacitive method—also known as self-capacitance—for example as disclosed in U.S. Pat. No. 4,293,734 (Pepper, Oct. 6, 1981). A typical implementation of a surface capacitance type touch panel is illustrated in FIG. 1 and comprises a transparent substrate 100, the surface of which is coated with a conductive material that forms a sensing electrode 110. One or more voltage sources 120 are connected to the sensing electrode, for example at each corner, and are used to generate an electrostatic field above the substrate. When an input object 130 that is electrically conductive—such as a human finger—comes into close proximity to the sensing electrode, a capacitor 140 is dynamically formed between the sensing electrode 110 and the input object 130 and this field is disturbed. The capacitor 140 causes a change in the amount of current drawn from the voltage sources 120 wherein the magnitude of current change is related to the distance between the finger location and the point at which the voltage source is connected to the sensing electrode. Current sensors 150 are provided to measure the current drawn from each voltage source 120 and the location of the touch input event is calculated by comparing the magnitude of the current measured at each source. Although simple in construction and operation, surface capacitive type touch panels are unable to detect multiple simultaneous touch input events as occurs when, for example, two or more fingers are in contact with the touch panel.

Another well-known method of capacitive sensing applied to touch panels is the projected capacitive method—also known as mutual capacitance. In this method, as shown in FIG. 2, a drive electrode 200 and sense electrode 210 are formed on a transparent substrate (not shown). A changing voltage or excitation signal is applied to the drive electrode 200 from a voltage source 220. A signal is then generated on the adjacent sense electrode 210 by means of capacitive coupling via the mutual coupling capacitor 230 formed between the drive electrode 200 and sense electrode 210. A current measurement means 240 is connected to the sense electrode 210 and provides a measurement of the size of the mutual coupling capacitor 230. When the input object 130 is brought to close proximity to both electrodes, it forms a first dynamic capacitor to the drive electrode 270 and a second dynamic capacitor to the sense electrode 280. If the input object is connected to ground, as is the case for example of a human finger connected to a human body, the effect of these dynamically formed capacitances is manifested as a reduction of the amount of capacitive coupling in between the drive and sense electrodes and hence a reduction in the magnitude of the signal measured by the current measurement means 240 attached to the sense electrode 210.

As is well-known and disclosed, for example in U.S. Pat. No. 7,663,607 (Hotelling, Feb. 6, 2010), by arranging a plurality of drive and sense electrodes in a grid array, this projected capacitance sensing method may be used to form a touch panel device. In such a system the location of touch input is determined by monitoring the capacitance changes at each intersection of drive electrode and sense electrode in the array. If the sensitivity of the projected capacitive touch sensor is sufficiently high, the measured capacitance may change considerably as the input object approaches, but does not touch, the touch panel surface. A threshold value of capacitance change is therefore defined such that when the measured change exceeds this threshold value the input object is considered to be touching the surface. An advantage of the projected capacitance sensing method over the surface capacitance method is that multiple simultaneous touch input events may be detected.

A limitation of the capacitance measurement techniques described above as conventionally applied to touch panels is that they are incapable of detecting input from non-conductive or insulating objects, for example made of wood, plastic or the like. Provided that a non-conductive object has a dielectric permittivity different to air it will cause the measured array capacitances to change when in close proximity to the touch panel surface. However, the magnitude of the resulting signal is very small—for example, less than 1% of that generated by a conductive object—and is dependent on the type of material the non-conductive object is made of and the ambient environment conditions. This disadvantageously reduces the usability of the touch panel since it is restricted to operation using conductive input objects, such as a finger or metallic pen or stylus. In particular, the user cannot operate a touch panel reliably while wearing normal (non-conductive) gloves or while holding a non-conductive object such as a plastic pen.

Although drops of water on the touch panel surface may be considered as non-conductive objects, the drops are not considered input objects under control of the user and their effect should therefore be rejected as opposed to detected. For example, US Patent Application 20040189617 (Gerpheide, Sep. 30, 2004) describes a capacitive touch panel that is capable of compensating for the effect of drops of water on the touch panel surface. The touch panel array includes an additional electrode to detect the presence of the non-conductive water droplets so that the touch panel may be used in wet conditions. The touch panel is not however capable of detecting the location of non-conductive input objects in general.

It is therefore desirable to provide a means of detecting both conductive and non-conductive types of input object using a capacitive type touch panel. Further, it is desirable to provide a means of distinguishing between conductive and non-conductive types of input object.

SUMMARY OF THE INVENTION

A capacitive touch panel in accordance with the present invention provides a means of reliably detecting non-conductive input objects as well as conductive input objects and of distinguishing between conductive and non-conductive input objects.

The touch panel includes an array of electrode elements comprising a plurality of drive and sense electrodes. The sense electrodes or the drive electrodes may be arranged as pairs such that two sense electrodes (or two drive electrodes) are provided at every intersection in the array. The electrodes are further arranged such that, for example, a first sense electrode of a sense electrode pair is separated from a drive electrode by a shorter distance, in the plane of the sensor substrate, than a second sense electrode of the sense electrode pair. The first sense electrode forms a first mutual capacitor with the drive electrode. The second sense electrode forms a second mutual capacitor with the drive electrode.

A non-conductive input object in close proximity to the touch panel surface will cause a change in the capacitance of the first and second mutual capacitors. Due to the change in electric field distribution caused by the presence of the non-conductive input object the capacitances of the first and second mutual capacitors will change in a first way characterized by a decrease in the capacitance of the first mutual capacitor and an increase in the capacitance of the second mutual capacitor. On the other hand, a conductive input object in close proximity to the touch panel surface will cause the capacitances of the first and second mutual capacitors to change in a second way characterized by a decrease in the capacitance of both the first and second mutual capacitances. The first and second mutual capacitances at each electrode element in the array are measured and analysed to detect the position of the input object—including whether or not the input object is touching the surface of the touch panel—and whether the input object is conductive or non-conductive.

The capacitive touch panel in accordance with the present invention may be used to advantage in a number of ways, providing convenience or improved experience to the user. For example a capacitive touch panel may be part of a device (such as smart phone, tablet PC or public information device) in which an application ("app") may execute. A capacitive touch panel provides inputs to the application such as pointing, touching, swiping, gesturing and so on.

For example, a device comprising the capacitive touch panel of the present invention may be configured in such a way that any kind of input object, conductive or non-conductive, may be used to operate the device in the same manner. The advantage to this would be that the user may operate such a capacitive touch panel even while wearing ordinary (non-conductive) gloves, or by pointing with a plastic stylus, in addition to the usual methods of interaction with a conventional capacitive touch panel.

For example, a device comprising the capacitive touch panel in accordance with the present invention may be configured to operate in a different mode depending on what type of input object is used. For example, a drawing application may be configured to draw when a conductive input object is used and to erase when a non-conductive input object is used. In this way the user could conveniently draw in the application using a pencil tip (conductive graphite), then erase in the application using the eraser on the other end of the pencil, and the mode to be detected automatically without any additional action by the user.

Advantageously, the touch panel in accordance with the present invention therefore provides a means of detecting both conductive and non-conductive types of input object using a capacitive-type touch panel. The usability of the touch panel is therefore improved whilst maintaining the other benefits of the capacitive-type touch panel. Further, the touch panel in accordance with the present invention also provides a means of distinguishing between conductive and non-conductive types of input object and of using this information to improve the usability of a user interface.

According to one aspect of the invention, a mutual capacitance touch sensor includes: a substrate; an array of electrode elements formed on the substrate, each electrode element including at least one of a first electrode group comprising at least two drive electrodes and at least one sense electrode, or a second electrode group comprising at least two sense electrodes and at least one drive electrode, wherein the respective electrodes of the first or second group are arranged to form multiple capacitances over different coupling distances; and a controller operatively coupled to the array of electrode elements, the controller configured to assign an input object as a conductive object according to a first characteristic change of the multiple capacitances as the input object approaches the touch sensor, and assign the input object as non-conductive object according to a second characteristic change of the multiple capacitances different from the first characteristic change as the input object approaches the touch sensor.

According to one aspect of the invention, the first characteristic change is a decrease in capacitance of the multiple capacitances as the input object approaches the touch sensor, and the second characteristic change is an increase in capacitance of at least one of the multiple capacitances as the input object approaches the touch sensor.

According to one aspect of the invention, the controller is configured to determine, based on measurements of the multiple capacitances, a location and height of the object relative to a surface of the touch sensor.

According to one aspect of the invention, the at least two sense electrodes of the second electrode group are arranged as pairs such that two sense electrodes are provided at every row-column intersection in the array.

According to one aspect of the invention, a first sense electrode of a sense electrode pair is separated from the drive electrode by a shorter distance, in a plane of the sensor substrate, than a second sense electrode of the pair of sense electrodes.

According to one aspect of the invention, the at least two drive electrodes of the first electrode group are arranged as pairs such that two drive electrodes are provided at every row-column intersection in the array.

According to one aspect of the invention, a second drive electrode of the pair of drive electrodes is separated from the sense electrode by a greater distance, in a plane of the sensor substrate, than a first drive electrode of the pair of drive electrodes.

According to one aspect of the invention, the at least two drive electrodes of the first electrode group are arranged as drive electrode pairs and the at least one sense electrode of the first electrode group is arranged as a sense electrode pair such that two drive electrodes and two sense electrodes are provided at every row-column intersection in the array.

According to one aspect of the invention, a first sense electrode of the sense electrode pair is split into two parts that run adjacent to a side of a second sense electrode of the sense electrode pair.

According to one aspect of the invention, a first drive electrode of the drive electrode pair is split into two parts that run adjacent to a side of a second drive electrode of the drive electrode pair.

According to one aspect of the invention, the sense electrodes of the second electrode group are arranged as a plurality of sense electrode pairs, each pair including a first dual-function sense electrode and a second dual-function sense electrode, and the at least one drive electrode comprises a pair of drive electrodes, or wherein the drive electrodes of the first electrode group are arranged as a plurality of drive electrode pairs, and the at least one sense electrode comprises a pair of sense electrodes, each pair including a first dual-function sense electrode and a second dual-function sense electrode.

According to one aspect of the invention, the sense electrode pairs are divided into odd numbered sense electrode pairs and even numbered sense electrodes pairs, and the drive electrode pairs are divided into odd numbered drive electrode pairs and even numbered drive electrodes pairs. A majority of the first odd numbered dual function sense electrodes of a pair of sense electrodes are adjacent the first odd numbered dual-function drive electrodes of a pair of drive electrodes, and a majority of the second odd numbered dual-function sense electrodes of the pair of sense electrodes are adjacent the first even numbered dual-function drive electrodes of the pair of drive electrodes. A majority of the second even numbered dual-function sense electrodes of a pair of sense electrodes are adjacent the second even numbered dual function drive electrodes of a pair of drive electrodes, and a majority of the second odd numbered dual-function sense electrodes of the pair of sense electrodes are adjacent the first even numbered dual-function drive electrodes of the pair of drive electrodes.

According to one aspect of the invention, the sense electrode pairs are divided into odd numbered sense electrode pairs and even numbered sense electrodes pairs, and the drive electrode pairs are divided into odd numbered drive electrode pairs and even numbered drive electrodes pairs. A majority of the first odd numbered dual function sense electrodes of a pair of sense electrodes are adjacent the first odd numbered dual-function drive electrodes of a pair of drive electrodes, and a majority of the second odd numbered dual-function sense electrodes of the pair of sense electrodes are adjacent the first even numbered dual-function drive electrodes of the pair of drive electrodes. A majority of the first even numbered dual-function sense electrodes of a pair of sense electrodes are adjacent the second odd numbered dual function drive electrodes of a pair of drive electrodes, and a majority of the second even numbered dual-function sense electrodes of the pair of sense electrodes are adjacent the first even numbered dual-function drive electrodes of the pair of drive electrodes.

According to one aspect of the invention, sense electrode pairs are formed in a first transparent conductive layer and drive electrode pairs are formed in a second transparent conductive layer, the first and second transparent conductive layers separated by an insulating layer.

According to one aspect of the invention, the sense electrode pairs are divided into odd numbered sense electrode pairs and even numbered sense electrodes pairs, and the drive electrode pairs are divided into odd numbered drive electrode pairs and even numbered drive electrodes pairs. A majority of the first odd numbered dual function sense electrodes of a pair of sense electrodes are adjacent the first odd numbered dual-function drive electrodes of a pair of drive electrodes, and a majority of the second odd numbered dual-function sense electrodes of the pair of sense electrodes are adjacent the first even numbered dual-function drive electrodes of the pair of drive electrodes. A majority of the first even numbered dual-function sense electrodes of a pair of sense electrodes are adjacent the second odd numbered dual function drive electrodes of a pair of drive electrodes, and a majority of the second even numbered dual-function sense electrodes of the pair of sense electrodes are adjacent the second even numbered dual-function drive electrodes of the pair of drive electrodes.

According to one aspect of the invention, the controller is configured to select an action based on the determined type of the input object.

According to one aspect of the invention, a method for determining the presence, type or position of at least one input object relative to a touch panel is provided, wherein a controller circuit provides capacitance measurements from the touch panel. The method includes: inputting capacitance measurement data from the controller circuit into a data frame; calibrating the data frame such that data represented therein corresponds to a change in capacitance relative to a state when the at least one input object is not present; analysing the data in the data frame to determine if the at least one input object is within a detection range of the touch panel; and when the at least one input object is within the detection range of the touch panel, determining a type and position of the at least one input object based on the data in the data frame.

According to one aspect of the invention, determining a type and position of the at least one input object comprises: computing first and second synthetic subframes based on a combination of calibrated subframes; analysing the first and second synthetic subframes to determine a significant peak position in at least one of the first or second synthetic subframe; determining the type of the at least one input object at the determined significant peak position based on a change in at least one of the first or second synthetic subframes; and estimating the location of the at least one input object from the significant peak position.

According to one aspect of the invention, the synthetic subframes are obtained by low-pass filtering a weighted sum of calibrated subframes.

According to one aspect of the invention, the method includes estimating a location of the at least one input object as $POS_1(P)$, where P is the significant peak position and $POS_1$ is defined as a sum of point positions near P and weighted by a measured capacitance change in the first or second synthetic subframes.

According to one aspect of the invention, estimating includes defining a model of the calibrated data frame, the model describing an input object and a corresponding position of the input object relative to an electrode element, and for a given subframe the model operative to predict a change in capacitance that would be measured at the electrode element corresponding to the subframe due to the at least one input object being at the corresponding position.

According to one aspect of the invention, the method includes selecting an action based on the determined type of the at least one input object.

According to one aspect of the invention, the method includes selecting an action independent of the determined type of the at least one input object.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DESCRIPTION OF REFERENCE NUMERALS

Figure 1:
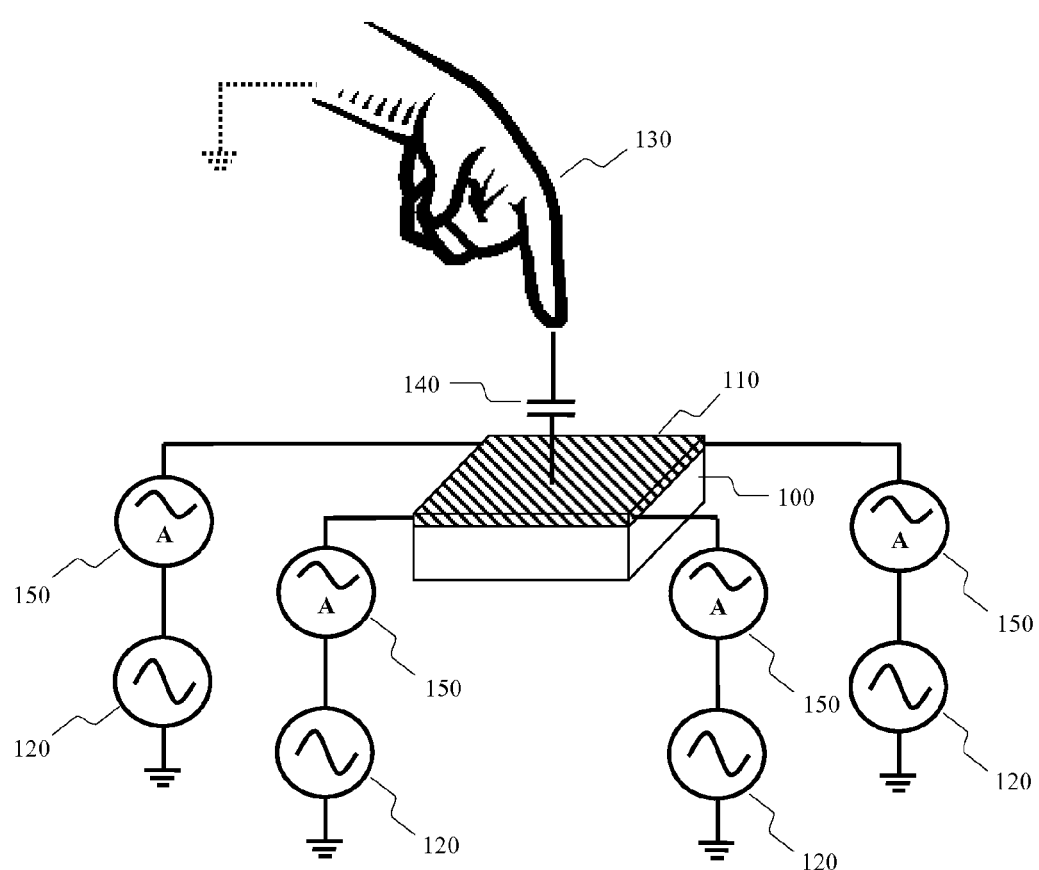
FIG. 1 shows a typical implementation of a surface capacitance type touch panel.
Figure 2:
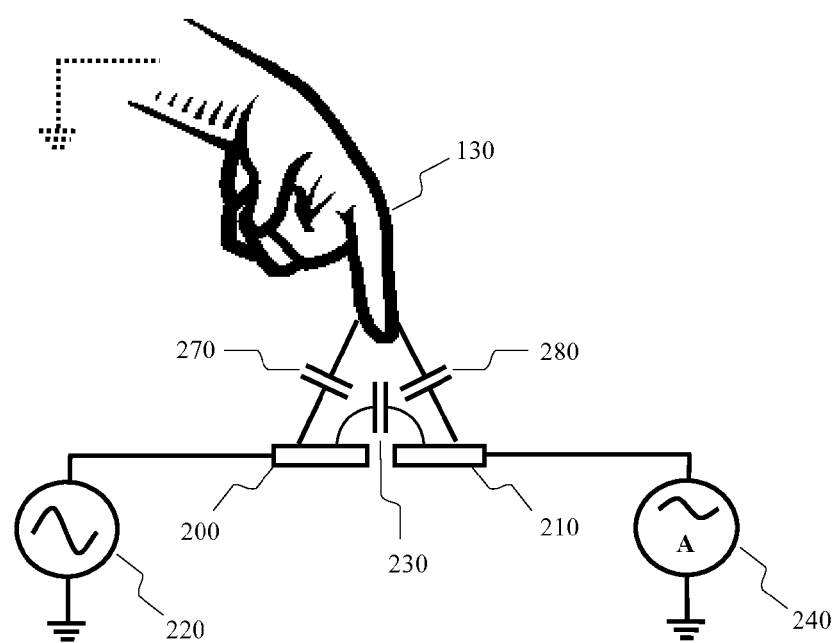
FIG. 2 shows a typical implementation of a projected capacitance type touch panel.

100 Transparent substrate
110 Sensing electrode
120 Voltage source
130 Input object
140 Capacitor
150 Current sensor
200 Drive electrode
210 Sense electrode
220 Voltage source
230 Mutual coupling capacitor
240 Current measurement means
270 Drive electrode
280 Sense electrode
310 First sense electrode SA
320 Second sense electrode SB
330 Drive electrode
340 Intersection
400 Electrode array
410 Sensor substrate
420 Transparent conductive layer
430 Driver signal wires
440 Sense signal wires
450 Conductive bridge layer
460 Insulating layer
470 Contact hole
510 Input object
520 Electric field lines
530 Active drive electrode
540 Inactive drive electrode
550 Second mutual coupling capacitor CB
560 First mutual coupling capacitor CA
875 Voltage pulse generator
880 Charge integrator circuit
881 Operational amplifier
882 Integration capacitor
883 Reset switch
884 First input switch
885 Second input switch
1000 Touch panel
1010 LCD
1020 Controller circuit
1030 Host electronics
1110 First drive electrode
1120 Second drive electrode
1130 Sense electrode
1210 First voltage source
1220 Second voltage source
1410 First sense electrode
1420 Second sense electrode
1430 First drive electrode
1440 Second drive electrode
1450 Intersection
1510 First mutual coupling capacitor CAA
1520 Second mutual coupling capacitor CBB
1530 Third mutual coupling capacitor CBA
1540 Fourth mutual coupling capacitor CAB
1600 Sense electrode pair
1610 First dual-function sense electrode
1612 First connecting wire
1620 Second dual-function sense electrode
1622 Second connecting wire
1626 Contact hole
1630 Drive electrodes
1650 Odd numbered drive electrode
1660 Even numbered drive electrode
1700 Odd numbered sense electrode pair
1702 Even numbered sense electrode pair
1704 Odd numbered drive electrode pair
1706 Even numbered drive electrode pair
1710 First odd numbered dual-function sense electrode
1715 First even numbered dual-function sense electrode
1720 Second odd numbered dual-function sense electrode
1725 Second even numbered dual-function sense electrode
1730 First odd numbered dual-function drive electrode
1735 First even numbered dual-function drive electrode
1740 Second odd numbered dual-function drive electrode
1745 Second even numbered dual-function drive electrode
1750 Via
1760 Connecting wire
1770 Intersection
1780 Sensor substrate
1782 Transparent conductive layer
1784 Insulating layer
1786 Conductive bridge layer 1788 Contact hole
1800 Odd numbered sense electrode pair
1802 Even numbered sense electrode pair
1804 Odd numbered drive electrode pair
1806 Even numbered drive electrode pair
1810 First odd numbered dual-function sense electrode
1815 First even numbered dual-function sense electrode
1820 Second odd numbered dual-function sense electrode
1825 Second even numbered dual-function sense electrode
1830 First odd numbered dual-function drive electrode
1835 First even numbered dual-function drive electrode
1840 Second odd numbered dual-function drive electrode
1845 Second even numbered dual-function drive electrode
1900 Input Data from controller
1910 Calibrate
1920 Detect input object
1925 Filter object type and position
1930 Output object type and position
2000 Calculate C and N
2010 Find significant peak position P in C or N
2020 Determine input object type at P
2030 Estimate approximate input object position
2040 All peaks done
2140 Improve estimate
2210 Models
2220 select model
2230 Get initial guess
2240 Evaluate error
2250 Good enough?
2260 Improve guess
2270 Prepare result
2300 input object type and shape
2310 select action
2320 action A
2330 action B
2400 action A Mathematical Symbols Used in the Description of the Embodiments s=1 ... S subframe index
$\Phi$, $\Phi_s$ general frame or subframe
P=(j, k) index of electrode element in J×K rectangular array
F', $F'_s$(j, k) uncalibrated frame, subframe $F'_s$ and electrode element (j, k).
F, $F_s$(j, k) calibrated frame
$\Delta C$ change in capacitance (i.e. calibrated)
$\overline{N}_s$(j, k) mean calibration noise of measurement
C, N synthetic subframes (for conductive & non-conductive detection)
$CW_s$, $NW_s$ weights for constructing C and N.
$V_s$(j, k) variance calibration noise of measurement
$\overline{V_C}$, $\overline{V_N}$ variance of the synthetic subframes
$L_d$(P) diagonal neighbours of P
$L_o$(P) orthogonal neighbours of P
$L_8$ (P) eight neighbours of P
SPC($\Phi$, $\theta$) significant peak candidates of subframe $\Phi$ with threshold $\theta$
Q(P)=q peak quality
c estimated input object type (true=conductive, false=non-conductive)
S={<P, c, q>} significant peaks
LPF spatial low-pass filter
x, y, z output spatial coordinates, (x, y) in plane, z perpendicular height
POS(P)=(x, y) position of electrode element in output spatial coordinates
w physical properties of input object (diameter)
e electrical property of input object (conductance/permittivity)
$M_C$, $M_N$, M(s; x, y, z, w, e) models of capacitance change
g=(x, y, z, w, e) guessed set of model parameters
E(F, P, M, g) error function in frame F, with given peak model & guess
r(s, p) error weighting for subframe s at relative point p.

DETAILED DESCRIPTION OF INVENTION

The present invention provides a capacitive touch sensor that may be used, for example, in touch panel display systems or the like. The touch sensor includes a sensor substrate, and an array of electrode elements formed over the sensor substrate. Each electrode element of the array includes at least one of a first electrode group comprising at least two drive electrodes and at least one sense electrode, or a second electrode group comprising at least two sense electrodes and at least one drive electrode. The respective electrodes of the first or second electrode group are arranged to form multiple capacitances over different coupling distances. In this manner, the multiple coupling capacitances can be used in combination to detect non-conductive input objects as well as conductive input objects. For example, a controller can be operatively coupled to the array of electrode elements and configured to determine whether or not an input object is touching the surface of the touch sensor and to determine whether the input object is conductive or non-conductive based on variations in the multiple capacitances. An object may be considered to be conductive if it presents an impedance to ground of 1 GOhm or less at the operating frequency of the touch panel. An object may be considered to be non-conductive if it presents an impedance to ground of more than 1 GOhm at the operating frequency of the touch panel. More specifically, the controller can be configured to assign an input object as a conductive object when measurements of the multiple capacitances change in a first characteristic way as the input object approaches the touch sensor, and assign the input object as non-conductive object when measurements of the multiple capacitances change in a second characteristic way different from the first characteristic way as the input object approaches the touch sensor. More specifically still, the first characteristic change may be observed as a decrease in the capacitance of all of the multiple capacitances and the second characteristic change may be observed as an increase in the capacitance of at least one of the multiple capacitances.

In accordance with a first and most general embodiment of the present invention, a capacitive touch panel (also referred to as a touch sensor) is provided with a means of reliably detecting non-conductive input objects as well as conductive input objects and of distinguishing between conductive and non-conductive input objects. The touch panel includes an electrode array comprising a plurality of drive and sense electrodes formed on a sensor substrate. The drive electrodes are excited with a voltage stimulus, either simultaneously or in sequence, and the resulting current that flows from the sense electrodes—due to the mutual coupling capacitance between the drive and sense electrodes—is measured. The sense electrodes may be arranged as pairs such that two sense electrodes are provided at every row-column intersection in the array (e.g., at each row-column intersection there is formed a first electrode group that includes at least two sense electrodes and at least one drive electrode). The electrodes are further arranged such that a first sense electrode of the pair is separated from the drive electrode by a shorter distance, in the plane of the sensor substrate, than a second sense electrode of the pair.

An input object in close proximity to the touch panel surface will cause a change in the capacitance of the mutual coupling capacitors. Due to the change in electric field distribution caused by the presence of the conductive input object the capacitance of the both mutual coupling capacitors will decrease. On the other hand, a non-conductive input object in close proximity to the touch panel surface will cause the mutual capacitance measured at the first sense electrode to decrease but the mutual capacitance measured at the second sense electrode to increase. Analysis of these capacitance changes may be used to calculate the location of the input object, whether or not it is touching the touch panel surface and whether the object is conductive or non-conductive.

Figure 3:
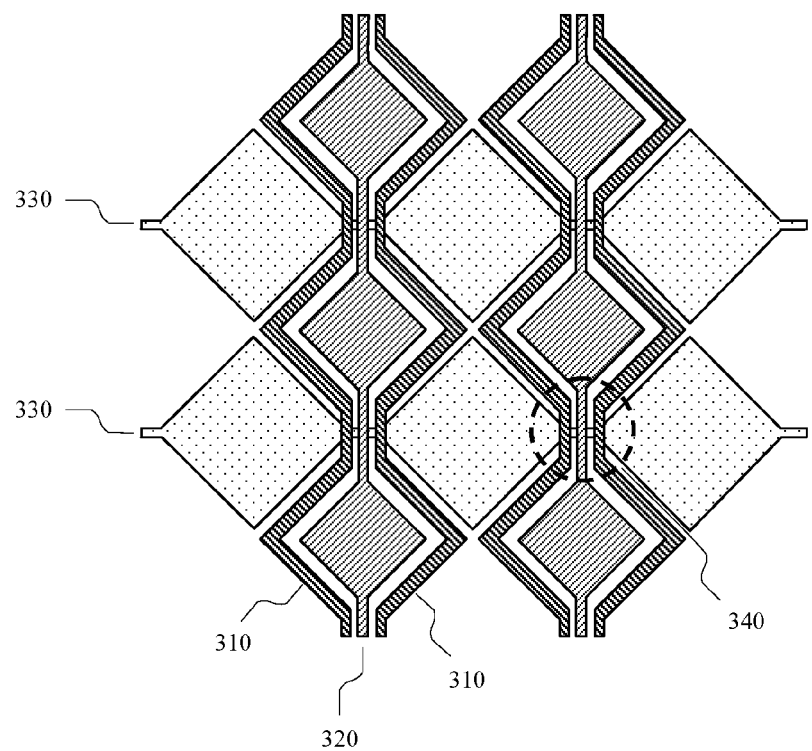
FIG. 3 shows a plan view of one example electrode geometry in accordance with the present invention.

An exemplary arrangement of the drive and sense electrodes is shown in FIG. 3, where the first sense electrode, SA 310, and the second sense electrode, SB 320, are symmetrically arranged at every intersection of the matrix. As used herein, the term "symmetry" refers to symmetry about at least one axis. The second sense electrode, SB 320, is patterned into interconnected diamonds, of the type commonly found in conventional projected capacitance sensor arrays. The first sense electrode, SA 310 is split into two parts, one of which runs on each side of SB 320. Accordingly, SA 310 is positioned closer than SB 320 to the drive electrodes 330. The electrode arrangement may be symmetrical around the centre line of SB 320. The two parts of SA 310 are electrically connected, either on the sensor substrate or within the external controller circuitry. The first sense electrode SA 310 forms a first mutual coupling capacitance CA with the drive electrode 330. The second sense electrode SB 320 forms a second mutual coupling capacitance CB with the drive electrode 330. Such an arrangement of drive and sense electrodes in a capacitive touch panel is described in U.S. application Ser. No. 13/436,010 filed on Mar. 30, 2012, which is hereby incorporated by reference in its entirety. The diamond pattern is just one of many known electrode geometries, commonly employed in mutual capacitive touch sensors. The present invention may equally be applied to other electrode geometries.

Figure 4:
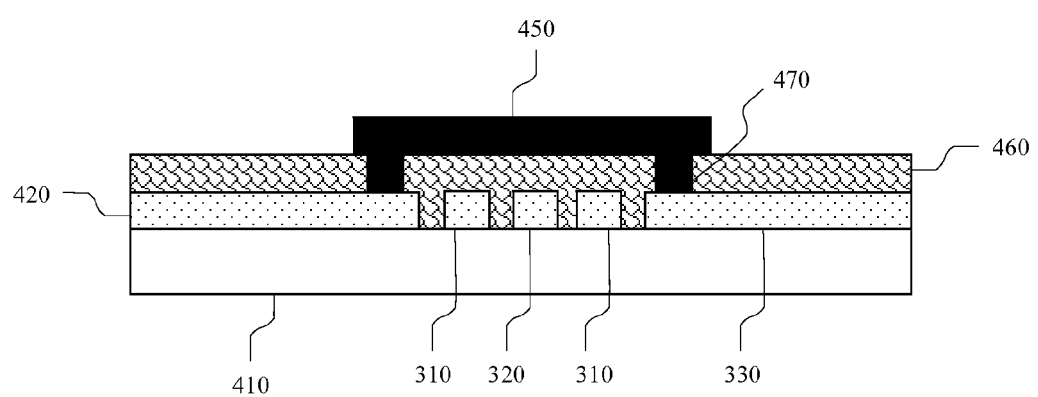
FIG. 4 shows a cross section of the sensor substrate in accordance with a first embodiment of the present invention.

The electrode array may be formed using, for example, standard photolithographic or printing techniques. FIG. 4 shows a cross section of the drive electrode 330 and first and second sense electrodes 310, 320 at an intersection 340 (See FIG. 3) to illustrate the touch panel structure. The electrodes are formed in a transparent conductive layer 420 which is deposited onto a sensor substrate 410. The transparent conductive layer 420 may be patterned into the pattern of the drive electrodes and sense electrode as described above. So that the drive and sense electrodes may cross each other without electrical contact an insulating layer 460 and a conductive bridge layer 450 may, for example, be deposited on top of the transparent conductive layer 420. This conductive bridge layer 450 may be patterned and used to connect different sections of the same electrode. At the locations where contact between the conductive bridge layer 450 and the transparent conductive layer 420 are required, contact holes 470 are created in the insulating layer 460. The sensor substrate 410 may be made of a transparent insulating material, such as glass, plastic or the like. The transparent conductive layer 420 may be a transparent conductive material such as, for example, Indium Tin Oxide (ITO) or Indium Zinc Oxide (IZO). The insulating layer 460 may be an insulating material such as, for example, silicon dioxide, silicon nitride or acrylic resin. The conductive bridge layer 450 may be an opaque metallic material such as, for example aluminium.

Figure 5:
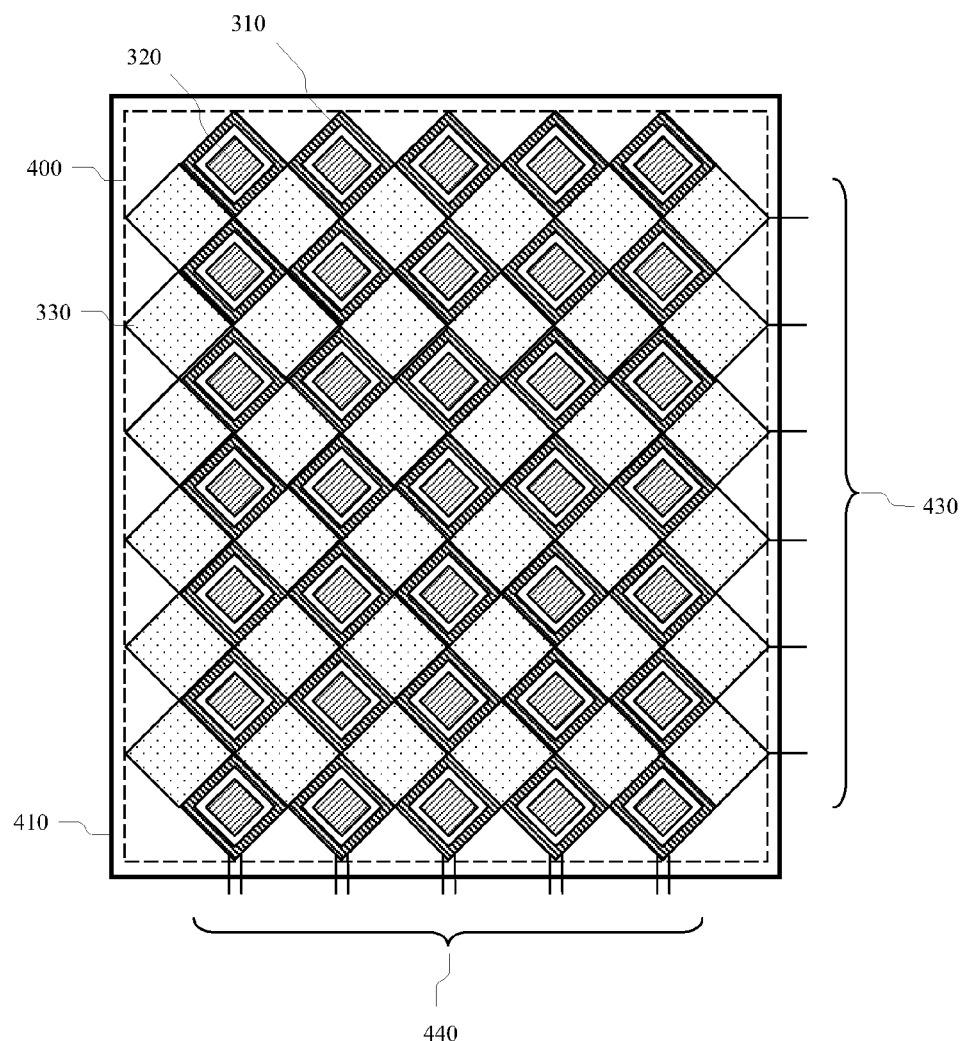
FIG. 5 shows a plan view of the sensor substrate.

As shown in FIG. 5, a plurality of such drive and sense electrodes may be arranged into an electrode array 400 and formed on the sensor substrate 410. Sense signal wires 440 may be connected to each of the first sense electrodes 310 and second sense electrodes 320 at one edge of the electrode array 400. Drive signal wires 430 may be connected to each of the drive electrodes 330 at another edge of the electrode array 400.

Figure 6:
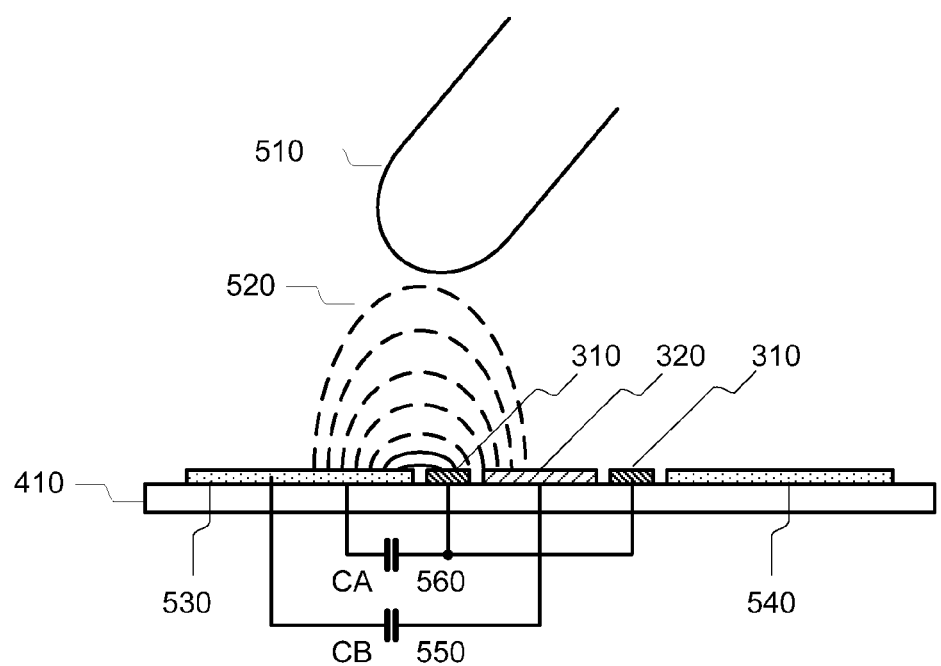
FIG. 6 shows the mutual capacitances associated with the electrodes of the electrode array.

The theory of operation of this electrode arrangement is illustrated in FIG. 6 which shows a cross-section of the sensor substrate 410, through an intersection 340 of the drive and sense electrodes. The second sense electrode SB 320 is separated, in the plane of the sensor substrate, from a first adjacent drive electrode 530 and a second adjacent drive electrode 540, by the two portions of the first sense electrode SA 310. In operation, a voltage stimulus is applied to the first adjacent drive electrode 530 whilst the second adjacent drive electrode 540 is maintained at a constant voltage. Herein the first adjacent drive electrode 530 is therefore referred to as the active drive electrode and the second adjacent drive electrode 540 as the inactive drive electrode. A potential difference therefore exists between the active drive electrode 530 and the first and second sensor electrodes, SA 310 and SB 320 and an electric field 520 extends from the electrode above the surface of the touch panel. A first mutual capacitor CA 560 is therefore formed over a first coupling distance between the active drive electrode and the first sensor electrode 310 and a second mutual capacitor CB 550 is formed over a second coupling distance between the active drive electrode 530 and the second sense electrode 320. The first mutual coupling capacitor CA 560 is therefore formed over a shorter coupling distance in the plane of the electrode array than the second mutual coupling capacitor CB 550. The capacitances of the first and second mutual capacitors, CA and CB, may change due to the presence of an input object. These changes in capacitance of the first and second mutual coupling capacitors from their baseline values (i.e. with no objects in proximity) are herein denoted by ΔCA and ΔCB respectively.

Figure 7:
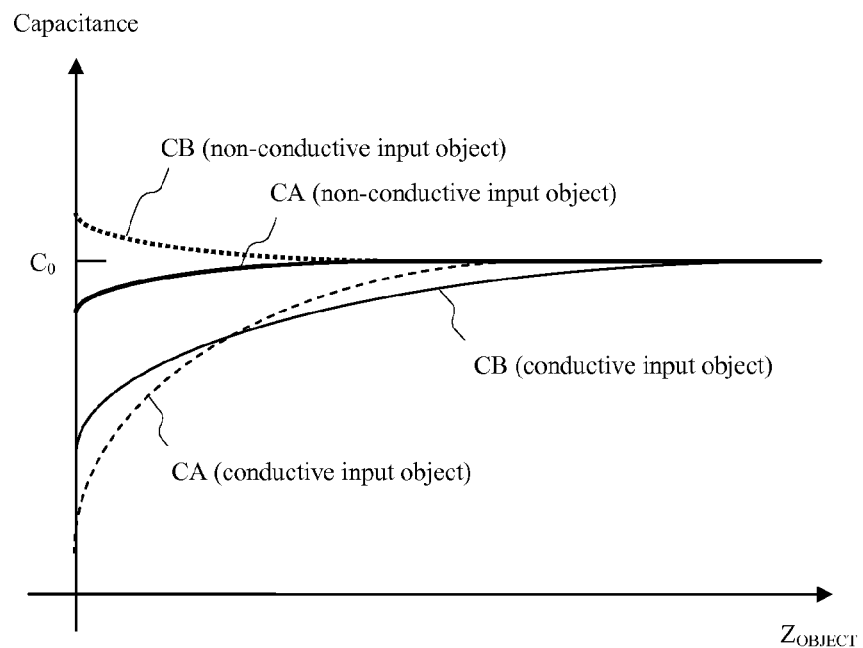
FIG. 7 illustrates the chance in capacitance of the mutual capacitors caused by a conductive and non-conductive input object in proximity to the touch panel of the present invention.

The relationship between the capacitance of the first and second mutual capacitors, CA 560 and CB 550 and the height of an input object 510 above the touch panel surface, $Z_{OBJECT}$, is illustrated in FIG. 7. If the input object 510 is conductive and connected to ground, such as a human finger, the capacitances of the first and second mutual capacitors, CA 560 and CB 550, will change in a first characteristic way. As illustrated, this first characteristic change may be observed as a decrease in both CA 560 and CB 550 from an initial value as the height of the input object above the surface of the touch panel is reduced. For convenience, in FIG. 7 the initial values of the first and second mutual capacitors are shown to be the same value $C_0$ though this need not necessarily be the case. These changes in capacitance are a well-known phenomenon that arise because the input object shunts a portion of the displacement current from the drive electrode to ground away from the sense electrodes. If the input object 510 is non-conductive, the capacitances CA 560 and CB 550 will change in a second characteristic way that is different from the first characteristic way. As illustrated, this second characteristic change may be observed as a decrease in the capacitance of the first mutual capacitor CA 560 and an increase in the capacitance of the second mutual capacitor CB 550 as the height of the input object is reduced. The change in the capacitance of the second mutual capacitor CB 550 arises because of the larger relative permittivity (dielectric constant) of the input object 510 compared to air. As the input object displaces the air as the capacitor dielectric material the effective dielectric constant of the second mutual capacitor is increased thus resulting in an increase in capacitance.

By comparing the measured capacitance values of the first and second mutual coupling capacitors across the array, it is possible to calculate the location of the input object, whether or not it is touching the touch panel surface and whether the input object is conductive or non-conductive. In one exemplary method the difference, ΔC, between the changes of the first and second mutual coupling capacitors, i.e., ΔCA−ΔCB, is calculated for every intersection in the electrode array. If the magnitude of this difference exceeds a pre-defined threshold value then an input object is determined to be touching the touch panel surface at the location of the intersection. If the sign of the difference is negative (i.e. ΔC=ΔCA−ΔCB<0) then the input object is determined to be conductive but if the sign of the difference is positive (i.e. ΔC=ΔCA−ΔCB>0) then the input object is determined to be non-conductive.

The changes in capacitance may further be examined to determine the height of the input object above the surface of the panel. For example, the magnitude of the difference, ΔC, may provide a measure of the input object height whilst the sign of the difference may provide a measure of the object type. Methods of calculating the height of an input object above the surface of a capacitive touch panel are disclosed in U.S. application Ser. No. 13/541,423 filed on Mar. 30, 2012, which is herein incorporated by reference in its entirety.

Figure 8:
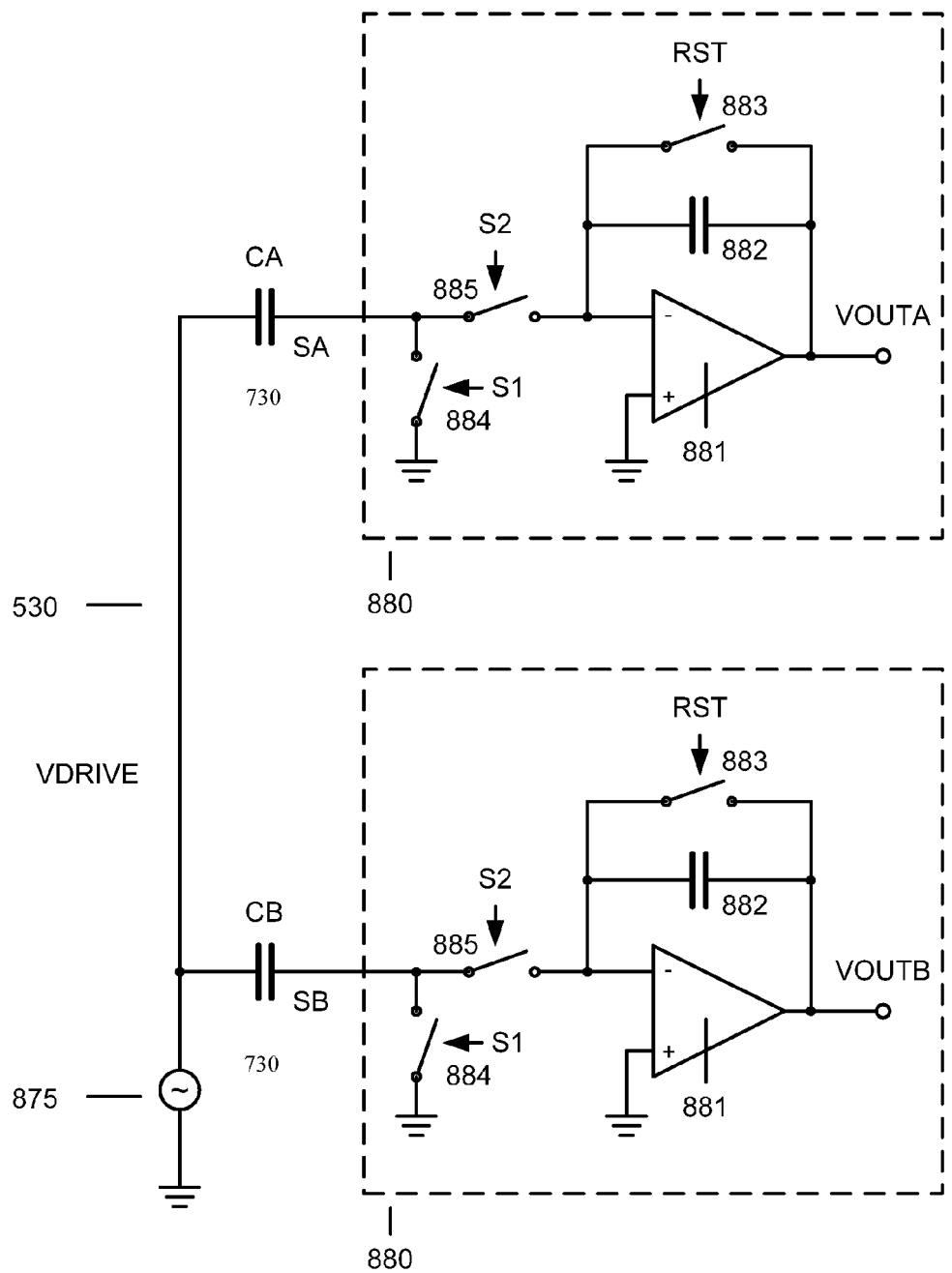
FIG. 8 shows a circuit that is able to measure the changes in the mutual capacitances of the touch panel of the present invention.

FIG. 8 shows a schematic diagram of a circuit that may be used to measure capacitances CA and CB. The circuit described herein is provided as an example of a capacitance measurement circuit using a charge transfer technique as is well-known in the field. Alternatively, other known circuits and techniques for capacitance measurement may be used. The schematic diagram shows the readout circuitry associated with a given pair of ring and centre sense electrodes. A voltage pulse generator 875 supplies drive voltage pulses to the active drive electrode 530, whilst charge integrator circuits 880 hold sense electrode SA 710 and sense electrode SB 730 at a constant voltage. Such charge integrator circuits 880 are well known to one skilled in the art, and typically comprise an operational amplifier 881, an integration capacitor 882 and a reset switch 883. The charge integrator circuits 880 additionally have a first input switch 884 and a second input switch 885, which are operated so as to accumulate charge onto the integration capacitors 882 over the course of multiple drive voltage pulses. The amount of charge accumulated on each integration capacitor is indicative of the mutual capacitance between the active drive electrode and the respective sense electrode, SA or SB.

Figure 9:
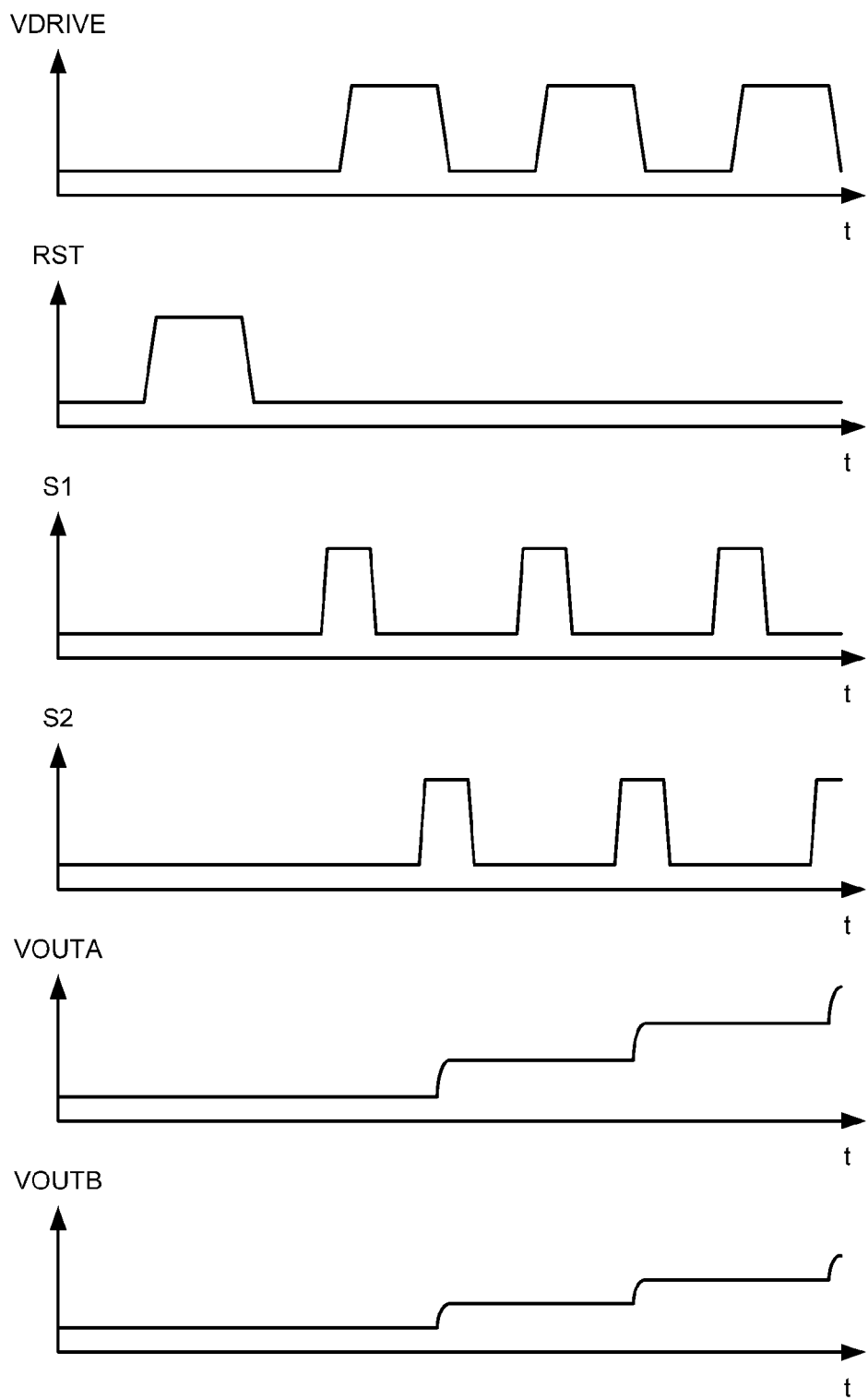
FIG. 9 shows a timing diagram that may be used to operate the circuit of FIG. 6.

The operation of the capacitance measurement circuit shown in FIG. 8 is now described with reference to the waveform diagram of FIG. 9. A switch 883 is firstly closed under the control of a reset switch control signal RST so that the output voltages VOUTA and VOUTB begin at a known voltage, such as the system ground potential. A first input switch 884 is then closed under the control of a first input switch control signal S1. The voltage pulse generator 875 now raises the voltage of the drive electrode 530 to a high voltage level and the input of the charge integrator is maintained at a constant level by the first input switch 884. Next, the input switch 884 is opened and the second input switch 885 is closed under the control of a second input switch control signal S2. The voltage pulse generator 875 now returns the voltage of the drive electrode 530 to a low voltage level causing charge to be injected across capacitor CA (or CB) and accumulate on the integration capacitor 882. This causes the output voltage of each integrator circuit to rise by an amount that corresponds to the capacitance, CA or CB, between the active drive electrode and the relevant sense electrode. This operation of applying a voltage pulse to the drive electrode 530 and cycling the first and second input switches may be repeated many times (for example 20 times) in order to generate a measurable voltage at the output of each integration circuit.

Figure 10:
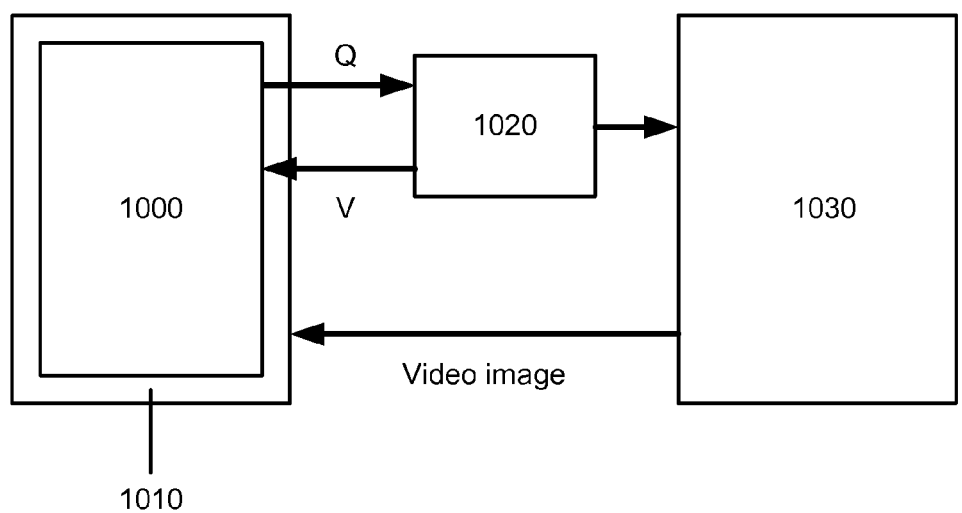
FIG. 10 shows a system that makes use of the touch sensor.

A capacitive touch panel system that employs the electrode arrangement and height sensing technique described above is shown in FIG. 10. A touch panel 1000 comprising the touch panel substrate 410 described above may be mounted on a liquid crystal display device 1010. Electrical connections are made between the touch panel 1000 and a controller circuit 1020. The controller circuit 1020, which includes voltage pulse generators and charge integrator circuits as shown in FIG. 8, issues a time varying voltage stimulus to the touch panel drive electrodes whilst maintaining a constant voltage at the touch panel sense electrodes. The controller circuit 1020 measures the charge that flows from the sense electrodes in response to the voltage stimulus, as this charge is indicative of the mutual capacitance between the drive electrodes and the sense electrodes. The measured capacitances are then conveyed to the host electronics 1030, which determine the position and type of input objects touching the surface of the sensor. Alternatively, the calculation of input object position and type may be accomplished within the controller circuit 1020, and the calculation result passed to the host electronics 1030. The host electronics may generate a video image in response to detected objects, and may pass this video image to the liquid crystal display device 1010.

Figure 11:
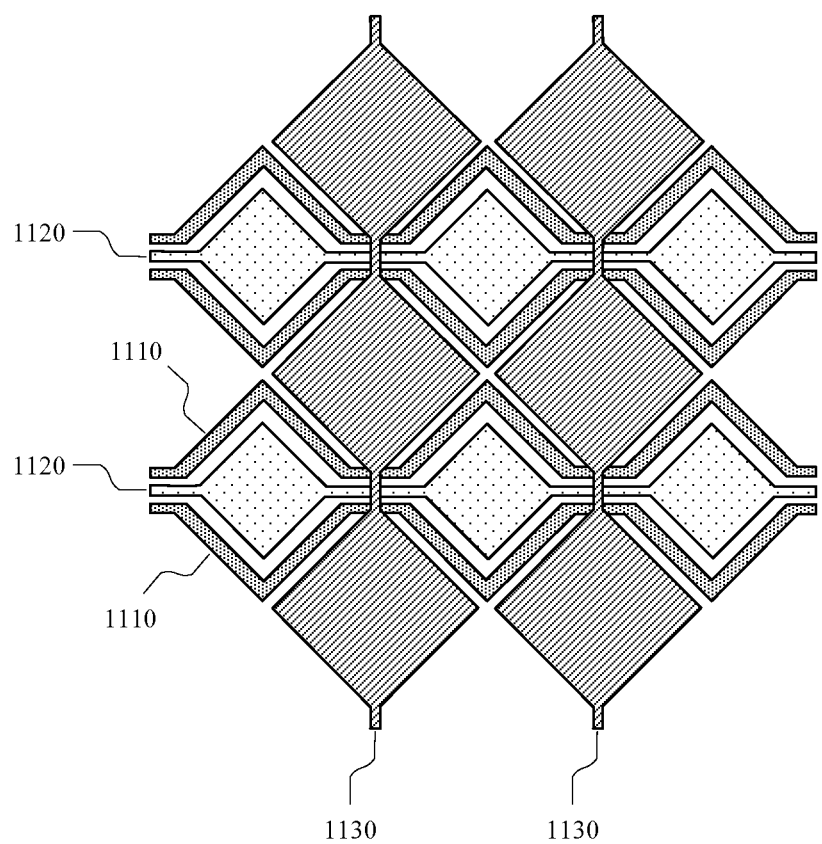
FIG. 11 shows a plan view of an electrode arrangement in accordance with a second embodiment of the invention.

In accordance with a second embodiment of the invention, shown in FIG. 11, the electrode array includes a plurality of drive electrodes and sense electrodes in which the drive electrodes are arranged in pairs such that two drive electrodes are provided at every intersection in the array. Each drive electrode pair includes a first drive electrode, DA 1110, and a second drive electrode, DB 1120. The second drive electrode DB 1120 may have a diamond geometry, while the first drive electrode DA 1110 may be split into two parts that run either side of the second drive electrode DB 1120. The electrode arrangement may be symmetrical around the centre line of the second drive electrode DB 1120. In this way, the second drive electrode DB 1120 is more distant from each sense electrode than the first drive electrode DA 1110. Accordingly, the mutual coupling capacitor between the first drive electrode DA 1110 and the sense electrode is similar to the capacitance CA above and the mutual coupling capacitor between the second drive electrode DB 1120 and the sense electrode is similar to the capacitance CB.

Figure 12:
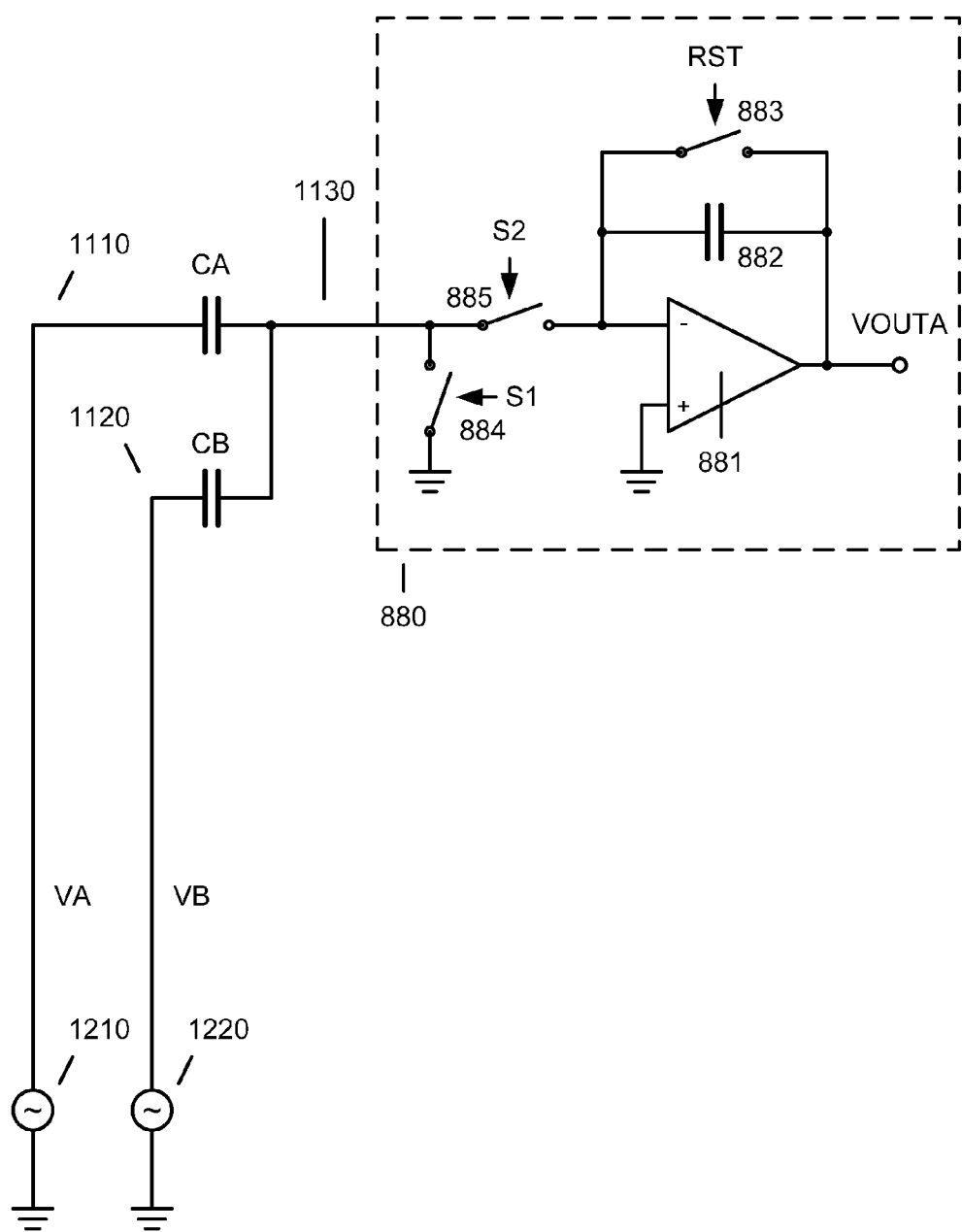
FIG. 12 shows a schematic diagram of a controller circuit that is suitable for use with the second embodiment.
Figure 13:
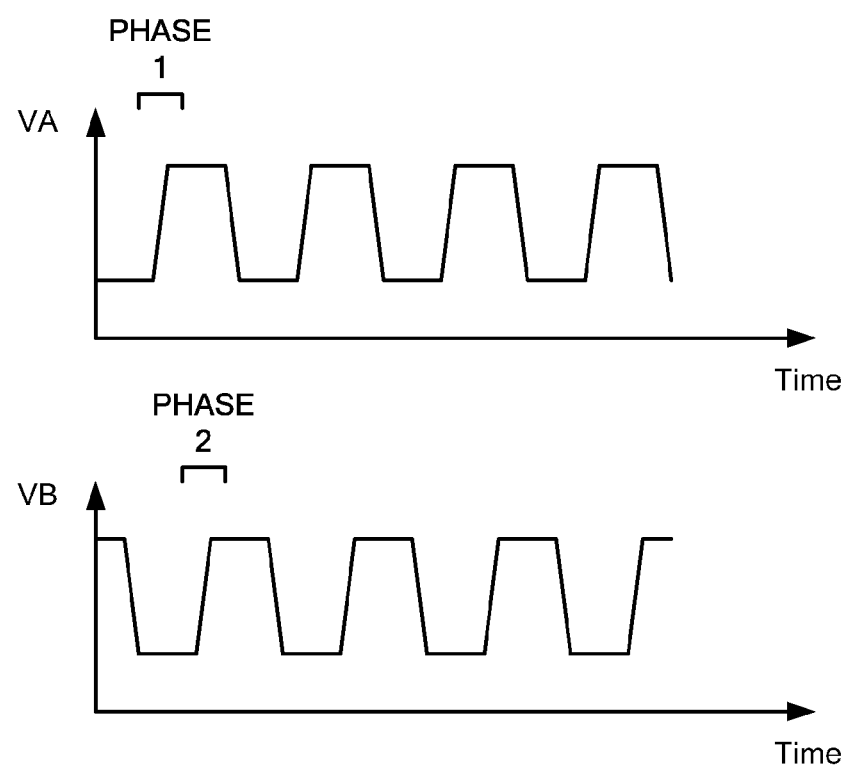
FIG. 13 shows one possible timing diagram for operation of the circuit shown in FIG. 14A.

This second embodiment is operated in two distinct phases for each pair of drive electrodes, as illustrated by the schematic diagram of FIG. 12 and the waveform diagram of FIG. 13. In a first phase, a first voltage source 1210 excites a first drive electrode DA 1110 with a changing electric potential (VA), and a second voltage source 1220 holds the second drive electrode DB 1120 at a constant electric potential (VB), whilst the charge that flows from each sense electrode 1130 is measured. In a second phase, the same first drive electrode DA 1110 is held at a constant electric potential, and the same second drive electrode DB 1120 is excited with a changing electric potential, whilst the charge that flows from each sense electrode 1130 is again measured. For each phase of operation, the timings for switches 883, 884, and 885 are as described above for the first embodiment and shown in FIG. 9. Following a similar procedure as that described above it is possible to determine whether or not an input object is touching the surface of the touch panel and whether the input object is conductive or non-conductive by comparing measurement results from the first and second phase, i.e., corresponding to the capacitances of CA and CB.

Figure 14:
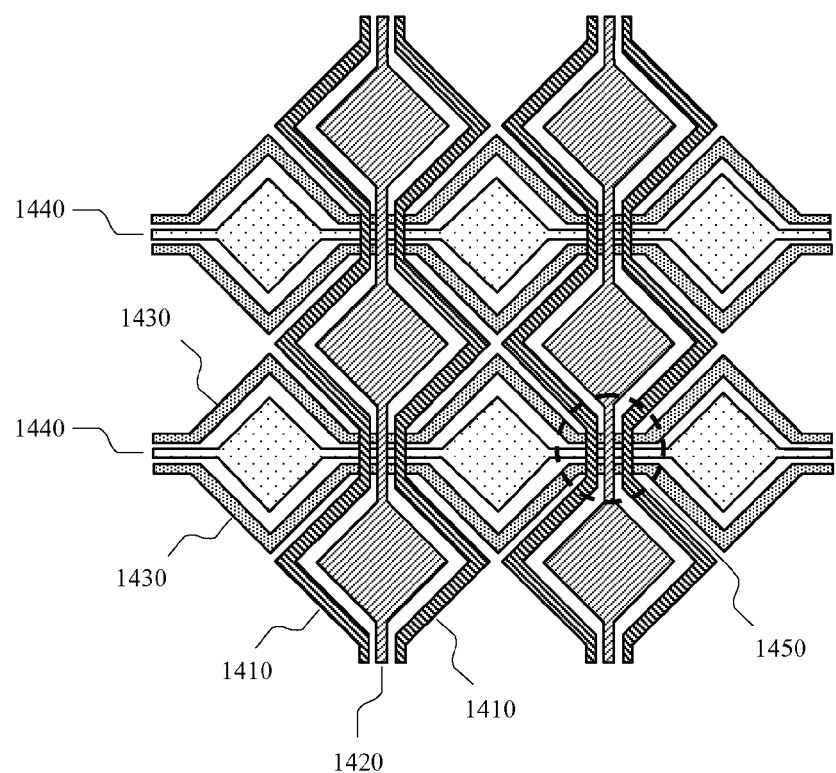
FIG. 14 shows a plan view of an electrode arrangement in accordance with a third embodiment of the invention.
Figure 15:
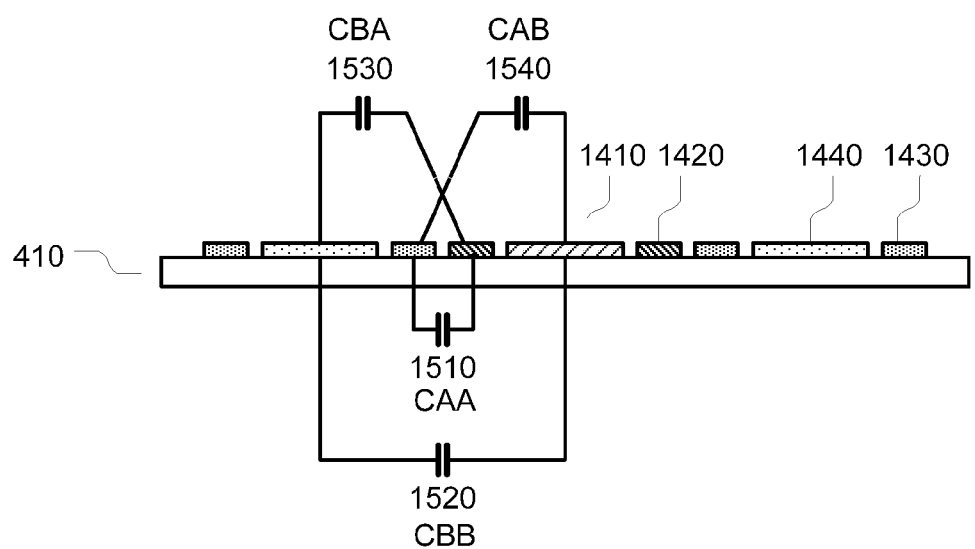
FIG. 15 shows the mutual capacitances associated with the electrodes of the electrode array of the third embodiment.

In accordance with a third embodiment of the invention, the electrode, array comprises a plurality of drive electrodes and sense electrodes arranged as drive electrode pairs and sense electrode pairs. FIG. 14 shows a plan view of the electrode geometry according to this embodiment. As with the first embodiment, the sense electrode pair includes a first sense electrode, SA 1410, and a second sense electrode, SB 1420. The first sense electrode SA 1410 is split into two parts, which run to either side of second sense electrode SB 1420. In addition, the drive electrode pair includes a first drive electrode, DA 1430, and a second drive electrode, DB 1440. As described in the second embodiment, the first drive electrode DA 1430 is split into two parts, which run to either side of second drive electrode DB 1440. Each electrode in the drive electrode pair forms a mutual coupling capacitor with each electrode in the sense electrode pair. One part of first drive electrode DA 1430 is positioned close to one part of first sense electrode SA 1410, in the plane of the sensor substrate. These electrodes are positioned between the second drive electrode DB 1440 and the second sense electrode SB 1420. As illustrated in the cross section diagram of FIG. 15, a first mutual coupling capacitor, CAA 1510, is formed over a first coupling distance between the first drive electrode DA and the first sense electrode SA and a second mutual coupling capacitor, CBB 1520, is formed over a second coupling distance between the second drive electrode 1440 and the second sense electrode 1420. The first mutual coupling capacitor CAA 1510 is therefore formed over a shorter coupling distance in the plane of the electrode array than the second mutual coupling capacitor CBB 1520. Two additional mutual coupling capacitances are also formed: a third mutual coupling capacitor, CBA 1530, between the second drive electrode DB 1440 and the first sense electrode SA 1410; and a fourth mutual coupling capacitor, CAB 1540, formed between the first drive electrode DA 1430 and the second sense electrode 1420.

This electrode array may be operated in two distinct phases. In a first phase, a voltage stimulus (changing electric potential) is applied to the first drive electrode DA and the second drive electrode DB is held at a constant electric potential. The charge that flows from the first sense electrode SA and the charge that flows from second sense electrode SB in response to this stimulus are measured. In a second phase, the first drive electrode DA is held at a constant electric potential whilst a voltage stimulus is applied to the second drive electrode DB. Again, the charge that flows from each sense electrode is measured. The capacitance values of the four mutual capacitors CAA 1510, CBB 1520, CBA 1530 and CAB 1540 are therefore measured by this method. The changes in capacitance of the mutual coupling capacitors CAA, CBB, CBA and CAB from their baseline values are herein denoted by ΔCAA, ΔCBB, ΔCBA and ΔCAB respectively. The changes in capacitances of the first and second mutual coupling capacitors ΔCAA and ΔCBB may be analysed to determine whether or not an input object is touching the surface of the touch panel and to determine whether or not the input object is conductive or non-conductive. An advantage of this arrangement of drive and sense electrodes is that there may be more difference between the change in capacitance of the first mutual capacitor, ΔCAA, and the change in capacitance of the second mutual coupling capacitor, ΔCBB than in the previous embodiments. A more accurate measure of touch location and a clearer distinction between the input object type is therefore possible.

Figure 16:
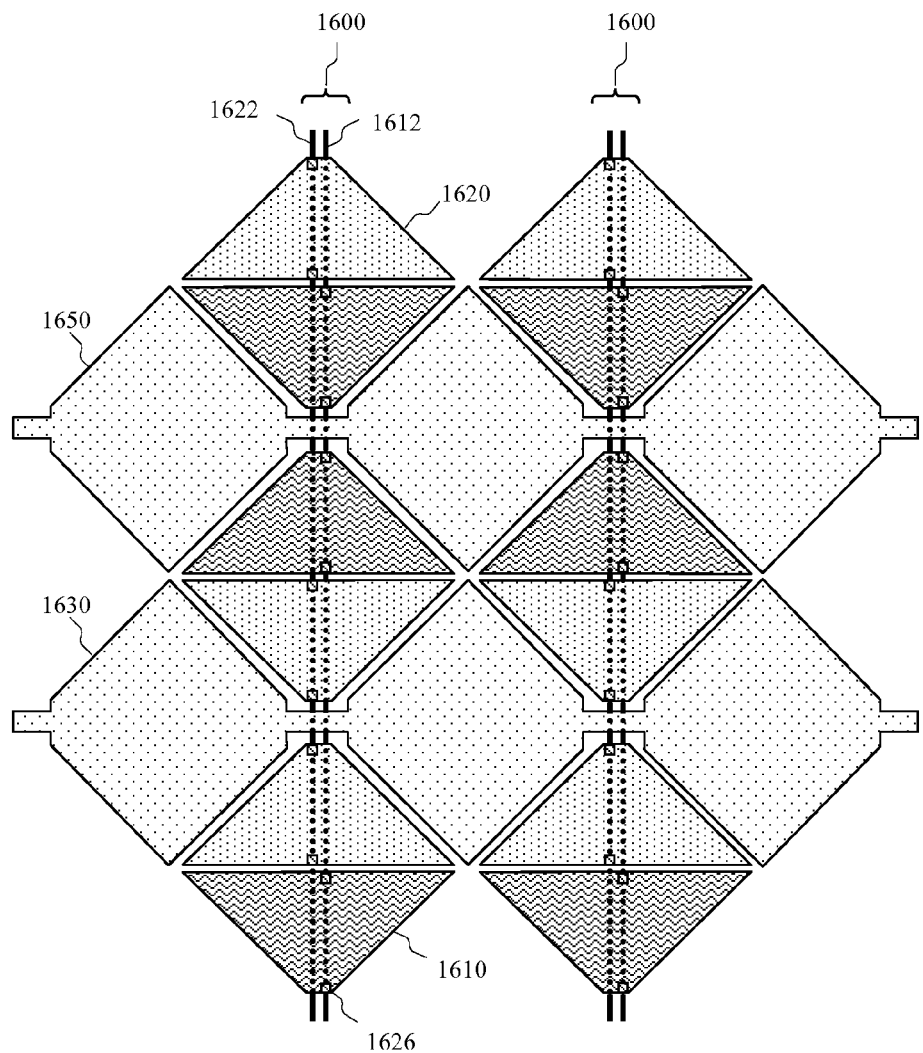
FIG. 16 shows a plan view of an electrode arrangement in accordance with a fourth embodiment of the invention.

FIG. 16 shows an electrode arrangement in accordance with a fourth embodiment of the invention. The electrode array of the present embodiment includes a plurality of sense electrode pairs 1600, each pair comprising a first dual-function sense electrode 1610 and a second dual-function sense electrode 1620, and a plurality of drive electrodes 1630, 1650. A first connecting wire 1612 is connected to the first dual-function sense electrode 1610 and a second connecting wire 1622 is connected to the second dual-function sense electrode 1620. The drive electrodes 1630, 1650 and the shapes of the first and second dual function sense electrodes 1610, 1620 may be formed in the transparent conductive layer 420 and the first and second connecting wires 1612, 1622 may be formed in the conductive bridge layer 450. Electrical isolation of the electrodes from the connecting wires is achieved by the insulator layer 460 between the transparent conductive layer 420 and the conductive bridge layer 450. Contact holes 1626 are formed in the electrically insulating layer 460 to connect the first and second connecting wires 1612, 1622 to the first and second dual-function electrodes 1610, 1620 respectively. The first and second connecting wires 1612, 1622 may be narrow such that they have negligible impact on the transparency of the touch panel. This electrode arrangement is described in U.S. application Ser. No. 13/435,898 filed on Mar. 30, 2012, which is herein incorporated by reference in its entirety.

The first dual-function electrode 1610, is adjacent to odd numbered drive electrodes 1650, while the second dual-function electrode 1620 is adjacent to the even numbered drive electrodes 1630 closely. Therefore when one of the odd numbered drive electrodes 1650 is excited, it forms a coupling capacitance to the first-dual function electrode 1610 over a short distance and a coupling capacitance to the second dual-function electrode 1620 over a longer distance. For the intersection of an odd numbered drive electrode 1650 and the sense electrode pair 1600, the first dual-function electrode 1610 may be considered as the first sense electrode SA as described above and the second dual-function electrode 1620 may be considered as the second sense electrode SB as described above. Conversely, for the intersection of an even numbered drive electrode and the sense electrodes, the first dual-function electrode 1610 may be considered as the second sense electrode SB as described above and the second dual-function electrode 1620 may be considered as the first sense electrode SA as described above. It is therefore possible to measure the first and second mutual capacitances CA and CB at all intersections in the array by appropriate interpretation of the charge integrator circuit output voltages.

An advantage of this arrangement of drive and sense electrodes is that the electrode fill factor may be improved. That is to say, the percentage of the area of the electrode array occupied by the drive and sense electrodes is increased. Accordingly, the signal-to-noise ratio of the touch panel may be improved and the object position may be more accurately calculated.

Figure 17A:
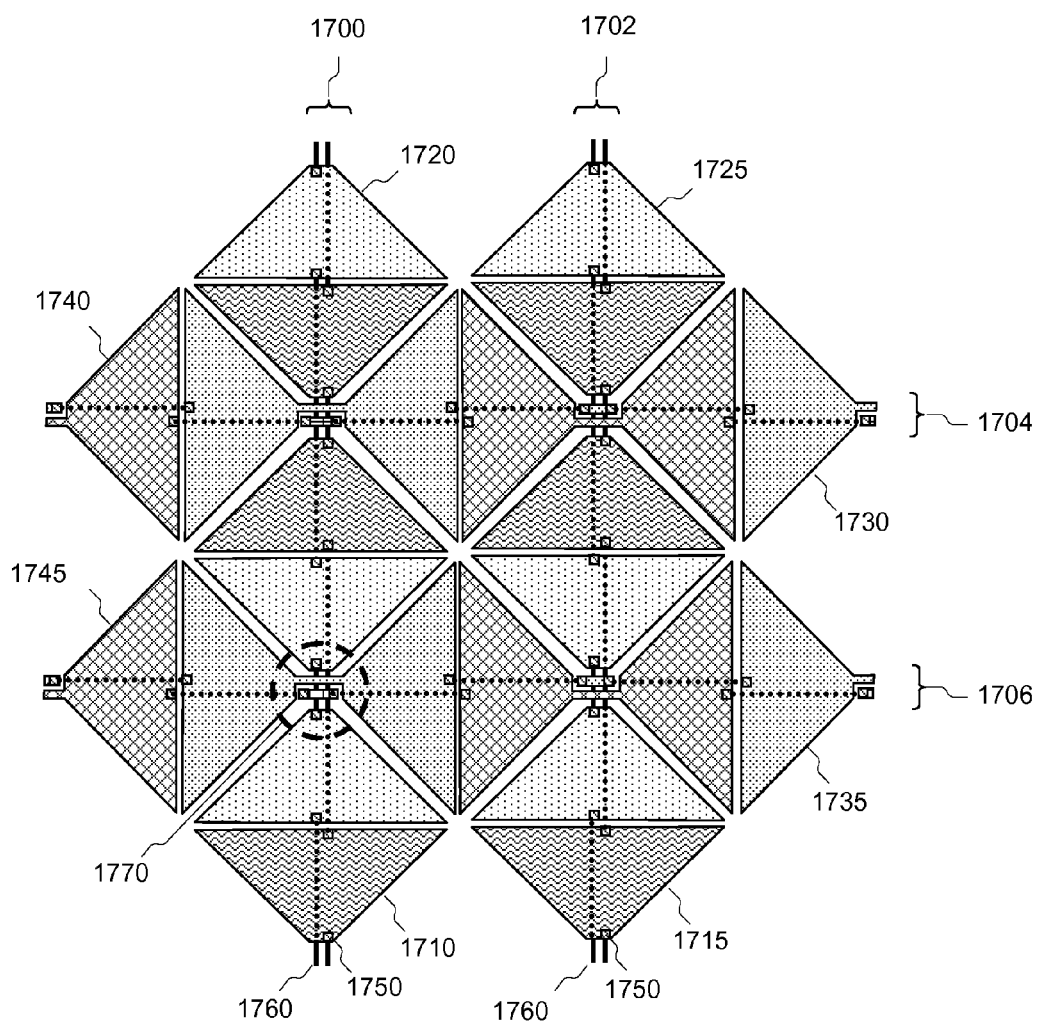
FIGS. 17A and 17B show a plan view of an electrode arrangement in accordance with a fifth embodiment of the invention.

In accordance with a fifth embodiment of the present invention, an electrode array includes sense electrode pairs and drive electrode pairs that are arranged as follows. The sense electrode pairs are divided into odd numbered sense electrode pairs 1700 and even numbered sense electrode pairs 1702. The drive electrode pairs are divided into odd numbered drive electrode pairs 1704 and even numbered drive electrode pairs 1706. The sense electrode pairs are formed by a first and second dual-function sense electrode and the drive electrode pairs are formed by a first and second dual-function drive electrode. As shown in FIG. 17A, the first odd numbered dual-function sense electrode, sense electrode A1 1710, is adjacent to the first odd numbered drive electrode, drive electrode A1 1730. The second odd numbered dual-function sense electrode, sense electrode B1 1720, is adjacent to the first even numbered drive electrode, drive electrode A2 1735. The first even numbered dual-function sense electrode, sense electrode A2 1715, is adjacent to the second odd numbered drive electrode, drive electrode B1 1740. The second even numbered dual-function sense electrode, sense electrode B2 1725, is adjacent to the second even numbered drive electrode, drive electrode B2 1745. Connecting wires 1760 may be used to connect between the different sections of each electrode. The electrode sections may be physically connected to the connecting wires by vias 1750.

Figure 17B:
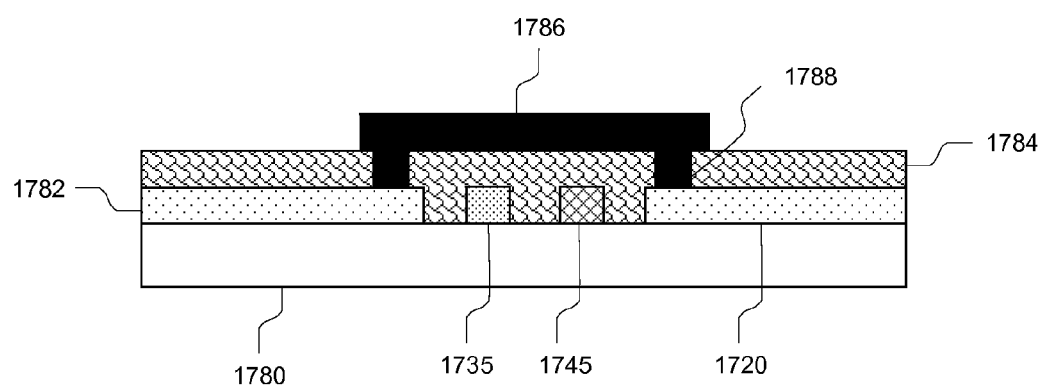

The electrode array of the present embodiment may be formed using, for example, standard photolithographic or printing techniques. FIG. 17B shows a cross section through the second odd numbered dual-function sense electrode, sense electrode B1 1720 at an intersection 1770 to illustrate the touch panel structure. The electrodes are formed in a transparent conductive layer 1782 which is deposited onto a sensor substrate 1780. The transparent conductive layer 1782 may be patterned into the pattern of the drive electrodes and sense electrode as described above. So that the drive and sense electrodes may cross each other without electrical contact an insulating layer 1784 and a conductive bridge layer 1786 may, for example, be deposited on top of the transparent conductive layer 1782. This conductive bridge layer 1786 may be patterned and used as the connecting wires 1760 to connect different sections of the same electrode. At the locations where contact between the conductive bridge layer 1740 and the transparent conductive layer 1720 are required, contact holes 1788 are created in the insulating layer 1784 to create the vias 1750. The sensor substrate 1780 may be made of a transparent insulating material, such as glass, plastic or the like. The transparent conductive layer 1782 may be a transparent conductive material such as, for example, Indium Tin Oxide (ITO) or Indium Zinc Oxide (IZO). The insulating layer 1784 may be an insulating material such as, for example, silicon dioxide, silicon nitride or acrylic resin. The conductive bridge layer 1786 may be an opaque metallic material such as, for example aluminium.

The capacitance of four different coupling capacitors may be measured at each electrode element in the electrode array of the present embodiment. For example, for an electrode element that corresponds to an odd numbered sense electrode pair and an odd numbered drive electrode pair, the first odd numbered dual-function sense electrode, sense electrode A1 1710, and the first odd numbered dual-function drive electrode, drive electrode A1 1730, form capacitor CAA. The first odd numbered dual-function sense electrode, sense electrode A1 1710, and the second odd numbered dual-function drive electrode, drive electrode B1 1740, form capacitor CAB. The second odd numbered dual-function sense electrode, sense electrode B1 1720, and the first odd numbered dual-function drive electrode, drive electrode A1 1730, form capacitor CBA. The second odd numbered dual-function sense electrode, sense electrode B1 1720, and the second odd numbered dual-function drive electrode, drive electrode B1 1740, form capacitor CBB. The capacitor CAA at each intersection is therefore formed over a short distance and the capacitor CBB is formed over a longer distance. The capacitances of the four different coupling capacitors CAA, CAB, CBA and CBB may be measured using the aforementioned methods. Object position and type may be calculated by computing the change in these capacitances from their baseline values due to the presence of an input object using one of the aforementioned methods. An advantage of the electrode array of the present embodiment is that the fill factor of the electrode pattern is improved and there is a large difference between the coupling distances of the capacitors CAA and CBB. A more distinct change in the measured capacitances due to the presence of an input object is therefore observed simultaneously with an increase in signal-to-noise ratio.

In accordance with a sixth embodiment of the present invention, an electrode array with improved optical performance is provided. The electrode array of the previous embodiment may suffer from the disadvantage that the connecting wires may be visible and adversely affect the quality of the displayed image when used in conjunction with a display. Accordingly, it is desirable to replace the conductive bridge layer 1786 with a second transparent conductive layer. However, transparent conductive materials typically exhibit a much lower conductivity than opaque metal materials. Forming the connecting wires 1760 with a transparent conductive material would therefore increase the resistance of the electrodes and lead to a reduction in the signal-to-noise ratio of the touch panel. The electrode array of the present embodiment, shown in FIG. 18, allows the electrode arrangement of the previous embodiment to be realized whilst minimizing the overall resistance of each electrode without adversely affecting the capacitance measurements.

Figure 18:
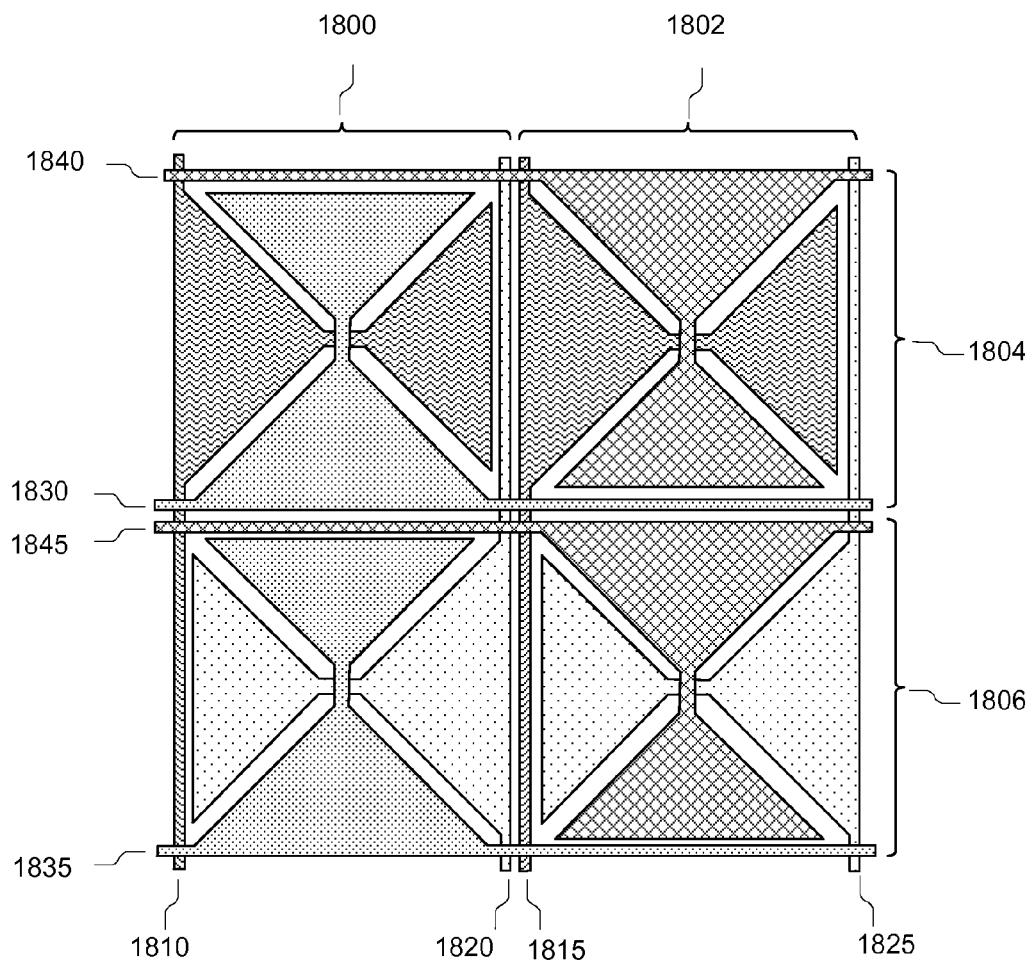
FIG. 18 shows a plan view of an electrode arrangement in accordance with a sixth embodiment of the invention.

The electrode array includes sense electrode pairs that are formed in a first transparent conductive layer and drive electrode pairs that are formed in a second transparent conductive layer. The first and second transparent conductive layers are separated by an insulating layer and may be arranged as shown in FIG. 18. The material used for the first and second conductive layers may be a transparent conductive material, such as, for example, Indium Tin Oxide (ITO) or Indium Zinc Oxide (IZO). The sense electrode pairs are divided into odd numbered sense electrode pairs 1800 and even numbered sense electrode pairs 1802. The drive electrode pairs are divided into odd numbered drive electrode pairs 1804 and even numbered drive electrode pairs 1806. The sense electrode pairs are formed by a first and second dual-function sense electrode and the drive electrode pairs are formed by a first and second dual-function drive electrode. The first odd numbered dual-function sense electrode, sense electrode A1 1810, is adjacent to the first odd numbered drive electrode, drive electrode A1 1830. The second odd numbered dual-function sense electrode, sense electrode B1 1820, is adjacent to the first even numbered drive electrode, drive electrode A2 1835. The first even numbered dual-function sense electrode, sense electrode A2 1815, is adjacent to the second odd numbered drive electrode, drive electrode B1 1840. The second even numbered dual-function sense electrode, sense electrode B2 1825, is adjacent to the second even numbered drive electrode, drive electrode B2 1845.

Accordingly, as in the previous embodiment, four coupling capacitors CAA, CBB, CAB and CBB are formed at each electrode element in the array, the capacitances of which may be measured and examined to determine object position and height. Advantageously, the resistance of the connecting wires formed in the first and second transparent conductive layers may be reduced without adversely affecting the capacitance measurement. For example, the width of the connecting wires may be increased to compensate for the lower conductivity of the transparent conductive material without affecting the signal-to-noise ratio of the capacitance measurements.

Figure 19:
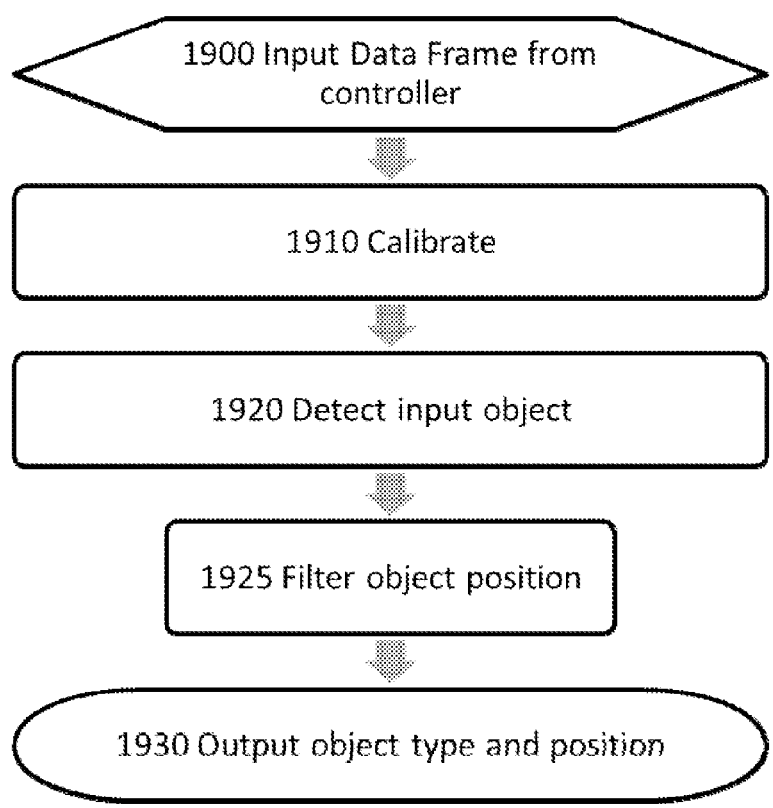
FIG. 19 shows a view of a series of processing steps in accordance with a seventh embodiment of the invention.

A seventh embodiment of the invention, summarised in FIG. 19 is described to explain in more detail how capacitance readings from electrode elements of the capacitive touch panel of the invention may be used to determine the presence, type or position of one or more input objects.

To simplify the disclosure herein it is assumed that all the processing is performed in the host electronics 1030. Capacitance data from the capacitive touch panel may be processed using digital, analogue or a combination of means. It will be understood by those normally skilled in the art that there are many equivalent embodiments for an algorithm, for example in embedded hardware such as a programmable gate array, FPGA or microcontroller, as part of the controller circuit 1020; or on a software platform connected to the hardware, such as in a CPU or GPU, as part of the host electronics 1030; or some combination of these or similar units. In addition, some steps in the computation may be suited to analogue hardware implementation methods within the controller circuit 1020 (for example, time averaging and subtracting offsets for calibration 1910). It will be further understood that the selection of method of implementation does not affect the essential character of the processing steps. Furthermore, the presentation of the processing steps as an ordered sequence of straightforward operations is simply for ease of understanding. Those skilled in the art will be well aware that processing steps may occur in a different order, or concurrently, depending on the data supplied and on the available computing resources, without changing their essential character; and that processing steps may also be replaced by different steps achieving similar results in the same spirit.

It is assumed here that the controller circuit 1020 provides capacitance measurements from the touch panel 1000 as an uncalibrated data frame, F'. The data frame comprises a number, S, of sub-frames, $F'_1 \ldots F'_S$, one for each measured capacitance at a typical electrode element. For example, if there are two measured capacitances at each electrode element as, for example, CA 560 and CB 550 from FIG. 6, then there will be two subframes. In general, if there are $S_d$ drive electrodes and $S_s$ sense electrodes at each electrode element, then there could be up to $S_s \times S_d$ subframes (and note that the controller circuit 1020 need not return all possible subframes, as some combinations of drive and sense may be judged to be of low information content and may be ignored). Each subframe comprises scalar values, one per electrode element, and each representing the capacitance measured at the corresponding electrode element. If the electrode elements are arranged in a rectangular J×K grid, then it is convenient to represent each subframe $F'_s$ as a 2D J×K array of scalar values, $F'_s(j, k)$. To ease the exposition, it is assumed that this is the case. (If the electrode elements happen not lie on a convenient rectangular grid no essential change is required in the algorithm given below as an example, except that subframe values in each neighbourhood will require more intricate indexing, as will be obvious to one normally skilled in the art. Alternatively data on a non-rectangular grid may be mathematically resampled to a rectangular grid using well-known resampling techniques, and then the present algorithm used without modification on the resampled data.) For notational convenience it is useful to assume that requesting values of any subframe $\Phi_s(j, k)$ lying outside the array bounds returns the value 0.

Typically the position of an input object near or on an electrode element corresponds to a position in an input space of the operating system or application on the device. For example, the electrode element (j, k) may correspond to pixel position (x, y) on an associated video display LCD 1010. For convenience assume that a function POS returns the (x, y) position of any electrode element, that is POS(j, k)=(x, y).

It is further assumed that $F'_1$ represents the subframe of data from each first mutual coupling capacitor formed over a first coupling distance, for example capacitor CA 560 or capacitor CAA 1510, and that $F'_s$ represents data from each second mutual coupling capacitor formed over a second coupling distance, for example capacitor CB 550 or capacitor CBB 1520. If S is greater than 2 then it follows that the intermediate one or more fields, $F'_2 \ldots F'_{S-1}$, represent data from the other mutual coupling capacitors in the electrode element.

FIG. 19 shows an exemplary sequence of steps to process a data frame. First the data frame is created by the input 1900 of sufficient data from the controller circuit 1020. Next the frame is calibrated 1910 so that the data it contains reflects capacitance change, ΔC, relative to a state of the panel when no input objects are present. The detector 1920 examines the input subframes to detect if there any input objects present within the detection range of the panel, and if so, their types and positions, which are then output 1930 for consumption by the operating system or any application of the device. The position information may also indicate whether the input object is considered to be in contact with the panel or not. The exact mechanism for output will naturally depend on the choice of operating system or the application, as is well known, and so is not described here. It will be understood that such information can allow the user of the device to point, to touch, to drag, to zoom, to rotate or to perform gestures and so on, in the usual manner of a device with a touch panel input.

In common with other touch panel devices, the algorithm of FIG. 19 will normally be repeated indefinitely, so long as the system is powered on and frame data is forthcoming from the controller circuit 1020. Also in common with many conventional touch panel devices, and as is well known, the output data of object presence and position may optionally pass through one or more time-based filters of object position 1925 to remove jitter and provide a smoother and more reliable experience for the user. For example, some hysteresis may be added to detection so that the pointer does not rapidly appear and disappear in some cases (akin to debouncing a mechanical switch); and a smoothing filter, such as the well-known Kalman filter, applied to the coordinates detected by the detector 1920. The selection and tuning of such filters is a well-known art, whose parameters will depend on the precise characteristics of each particular implementation (especially its accuracy and sampling rate), and the required trade-off between accuracy, smoothness and responsiveness.

The calibration step 1910 may be implemented as follows. At a time when it is known that no input object is present, for example during manufacturing or by instruction to the user, a number $n_0$, where $n_0$ is perhaps twenty or more depending on the signal to noise ratio of the measurements, of data frames $N^{<1>} \ldots N^{<n_0>}$ are gathered from the controller circuit 1020. Such data, since there is no signal, must consist of base-line capacitance plus random noise. It is simple to calculate the mean data noise frame, $\overline{N}$, and optionally data noise frame variance V, for each position (j, k) of each subframe s using the following standard equations:

$$\overline{N}_s(j, k) = \frac{1}{n_0} \sum_{l=1}^{l=n_0} N_s^{(l)}(j, k)$$

$$V_s(j, k) = \left[\frac{1}{n_0} \sum_{l=1}^{l=n_0} (N_s^{(l)}(j, k))^2\right] - (\overline{N}_s(j, k))^2$$

These values may be stored so that, at run time, calibration 1910 simply subtracts the mean base-line capacitance $\overline{N}$ from the raw frame F' to obtain calibrated frame data F.

$$F_s(j,k) = F'_s(j,k) - \overline{N}_s(j,k)$$

Note that the values of $F_s(j, k)$ represent the change in capacitance of subframe s at the electrode element (j, k) relative to the base-line capacitance when no input object is present. For example, the values of $F_s(j, k)$ may represent the changes in capacitance, $\Delta CA$ or $\Delta CB$, of the first or second mutual coupling capacitors, CA or CB, as described above.

As is well known, time-based filtering (such as time averaging) of the frame data may optionally be performed to increase the signal to noise ratio, if desired. It may be convenient to perform this as part of the calibration step 1910, and to appropriately reduce the variance estimate $V_s(j, k)$ accordingly.

Figure 20:
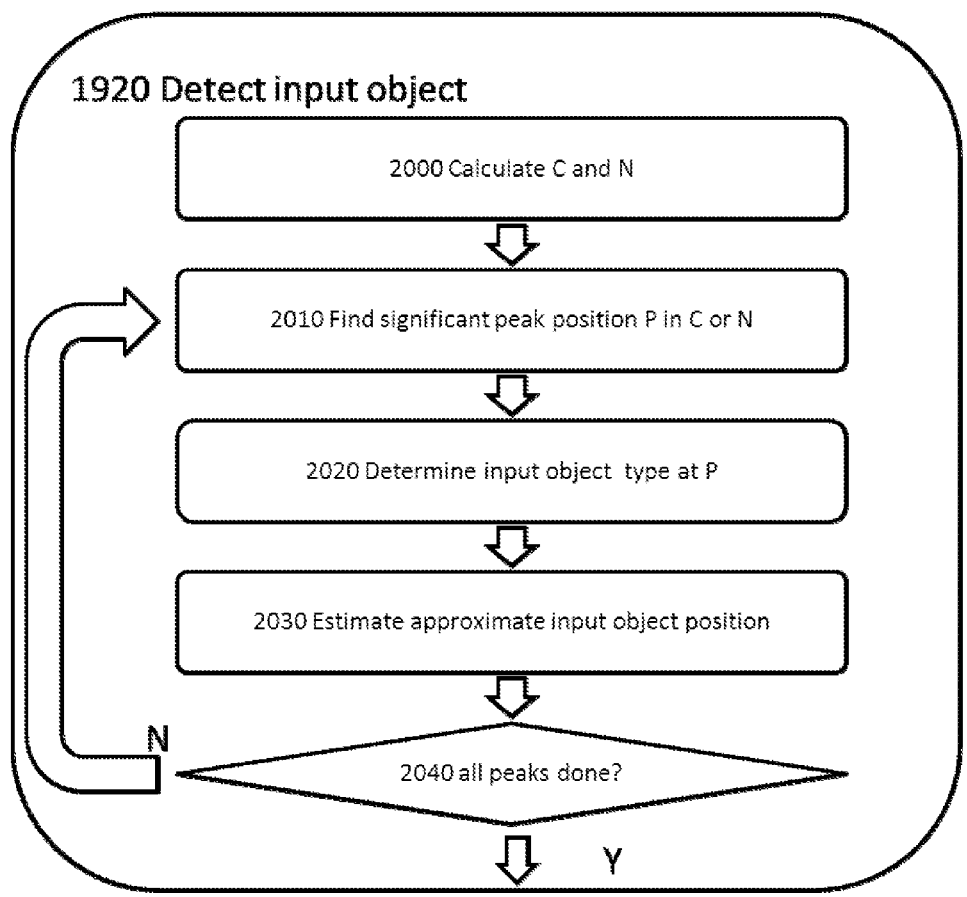
FIG. 20 shows in more detail one method for implementing the input object detection algorithm.

FIG. 20 shows in more detail one method for implementing an input object detector 1920. Two synthetic subframes C and N are computed 2000 and these are examined to find a candidate input object position P, corresponding to a peak in C or N 2010. Using this information the type of the input object can be determined 2020, and its position estimated 2030. When all the peaks have been examined 2040, the detector finishes. These steps are now explained in more detail.

The calibrated subframes are combined 2000 to produce new synthetic subframes C and N. C and N are designed to be used for detecting respectively a conductive and a non-conductive input object. The intention is that the position of local maxima (peaks) in C and N should correspond to positions of any input objects near to or touching the panel. In addition, it is advantageous that C and N contain as much capacitance signal as possible to reduce the effects of noise. One possible definition is $$C(j, k) = -\sum_{s=1}^{s=S} CW_s \cdot F_s(j, k)$$

$$N(j, k) = -NW_1 \cdot F_1(j, k) + \sum_{s=2}^{s=S} NW_s \cdot F_s(j, k)$$

Where the numbers $CW_s$ and $NW_s$ are positive per-subfield weighting factors which can be tuned to improve the signal to noise ratio.

Note that a conductive input object results in a capacitance decrease in all subframes, and so in all the calibrated subframes $F_s$ will be negative in the region around a conductive input object (ignoring noise), and therefore C will have a positive peak in such a region. A non-conductive input object results in a capacitance increase in all subframes apart from the first, and so all the calibrated subframes $F_s$ will be negative for s=1 and positive for s>1 in the region around a non-conductive input object (ignoring noise), and therefore N will have a positive peak in such a region.

Reasonable results can be achieved, depending on the electrode and sensor design, by taking $CW_s = NW_s = 1$ for each s. This is the simplest case, in which the noise variances $\overline{V}_s$ of each subframe are similar. In general it may be advantageous to combine subframes $F_s$ according to their noise variances $\overline{V}_s$, so that the frames with larger noise variance contribute relatively less to the total. It may also be advantageous to adjust the relative weights so that the highest values in C and N corresponding to conductive and non-conductive input objects touching the panel are of comparable magnitude. It is also possible to create synthetic subframes which are not simply linear combinations: for example any rational function of subframes.

It is useful to consider the mean variance noise $\overline{V}_s$ of each subframe, and the variance noise $\overline{V}$ of the synthetic subframes:

$$\overline{V}_s = \frac{1}{JK}\sum_{j=1}^{j=J}\sum_{k=1}^{k=K} V_s(j, k)$$

$$\overline{V^N} = \sum_{s=1}^{s=S} NW_s^2 \overline{V}_s$$

$$\overline{V^C} = \sum_{s=1}^{s=S} NW_s^2 \overline{V}_s$$

For a position P=(j, k) in an array of sensor elements, define the set $L_o(P)$ to be its four orthogonal neighbours, $L_d(P)$ to be its four diagonal neighbours, and $L_8(P)$ its eight nearest neighbours:

$$L_8(P) = L_o(P) \cup L_d(P)$$

$$L_o(P) = \{(j-1,k),(j+1,k),(j,k-1),(j,k+1)\}$$

$$L_d(P) = \{(j-1,k-1),(j-1,k+1),(j+1,k-1),(j+1,k+1)\}$$

If the spacing of sensor elements is significantly finer than the expected input object sizes, it may be advantageous to use larger sets of neighbours for one or more of finding significant peaks, for low-pass filtering, for refining peak position and for calculating matching error, which steps will be described later. It is straightforward to modify the method to accommodate such changes.

Define the significant peak candidates $SPC(\Phi, \theta)$ of a subframe $\Phi$ with threshold $\theta$ as a set of positions P in the subframe $$SPC(\Phi,\theta) = \{P | \Phi(P) > \theta \land \forall p \in L_8(P) \circ \Phi(P) \geq \Phi(p)\}$$

SPC can be calculated simply by enumerating all positions in the subframe and checking the conditions (though there are well known more efficient methods.)

To determine the significant peak positions $P_C$ in C or $P_N$ in N 2010 start by finding peak candidates which are significantly larger than the expected noise, $$P_C = SPC(C, \theta_1)$$

$$P_N = SPC(N, \theta_1)$$

where the threshold $\theta_1$ can be chosen, for example, as $$3\sqrt{\overline{V}},$$

that is, three standard deviations from the mean, to reduce the probability of detecting random noise as a peak.

Define a rough measure of the quality Q(P) of a peak position P to be the maximum height of its signal:

$$Q(P) = \max(C(P), N(P))$$

It is also advantageous to remove peaks which are conflicting or too close together as follows. If a point P is found in both $P_N$ and $P_C$, that is, $P \in P_N \cap P_C$, then it can be discounted, that is removed from both $P_N$ and $P_C$. Also, if point $P_1 \in P_N$ and point $P_2 \in P_C$ and $P_1 \in L_8(P_2)$ then whichever of $P_1$ or $P_2$ has the lower quality $Q(P_1)$ or $Q(P_2)$ should be discounted. Depending on the spacing of the sensor elements it may be advantageous to discount peaks more widely separated than just the $L_8$ neighbours.

The remaining positions $P_N \cup P_C$ are the positions of the significant peaks.

The input object type of an input object near P where $P \in P_N \cup P_C$ is defined as a Boolean, c, which is true if $P \in P_C$. Thus the input object type at P 2020 can be determined as "conductive" if c is true, "non-conductive" if c is false.

In a simple version of the embodiment, given a significant peak position P, the approximate input object position may be estimated 2030 as POS(P).

Each peak may be represented as a triple <P, c, q> where P is the position; c is a Boolean which is true if $P \in P_C$ and q=Q(P) is the quality. Define S to be the set of significant peaks, represented in this way.

In one variation of this embodiment only the type of a single input object is output. In this case determine the significant peak <P, c, q>∈S with the largest value of q. If c is true then the peak detector 1920 outputs "conductive" otherwise "non-conductive". If S is empty then the output is "no input object". In any case the peak detector 1920 terminates.

In another variation of this embodiment the type and approximate position of a single input object is output. In this case determine the significant peak <P, c, q>∈S with the largest value of q. The peak detector 1920 outputs POS(P) and, if c is true, "conductive" otherwise "non-conductive". If S is empty then the output is "no input object". In any case the peak detector 1920 terminates.

In another variation of this embodiment the type and approximate positions of up to $N_{SP}>1$ input objects are output. This would be suitable for a multitouch system. In this case determine those significant peaks <P, c, q>∈S with the up to $N_{SP}$ largest values of q. The peak detector 1920 outputs POS(P) for each one, and, for each one if c is true, "conductive" otherwise "non-conductive". If S is empty then the output is "no input object". In any case the peak detector 1920 terminates.

In another variation of this embodiment the detection of significant peaks is extended to consider more spread-out peaks which do not have a high peak value, but which cover a broad region. It may then be advantageous to consider also peaks in a spatially low-pass filtered version of C or N. In other words, the synthetic subframes can be obtained by low-pass filtering of a weighted sum of calibrated subframes. There are many possible low-pass spatial filters which would be suitable. For example, define the spatial low-pass filter LPF($\Phi$, a, b, c) of a subframe $\Phi$ as a new subframe given by $$LPF(\Phi, a, b, c)(P) = a \cdot \Phi(P) + b \cdot \sum_{p \in L_o(P)} \Phi(p) + c \cdot \sum_{p \in L_d(P)} \Phi(p)$$

The scalar parameters a, b and c may be chosen as, for example, the parameters of a Gaussian filter, for example a=0.6193, b=0.0838 and c=0.0113. Then the set of significant peak candidates in the filtered subframes may be combined with those in $P_C$ and $P_N$ to give $$P'_C = P_C \cup SPC(LPF(C,a,b,c),\theta_2)$$

$$P'_N = P_N \cup SPC(LPF(N,a,b,c),\theta_2)$$

$P'_C$ and $P'_N$ are then used in place of $P_C$ and $P_N$ respectively. The threshold $\theta_2$ may be chosen to be $2\sqrt{V}$, that is, two standard deviations. The parameters a, b, c, $\theta_2$ need not be identical for the two equations.

Figure 21:
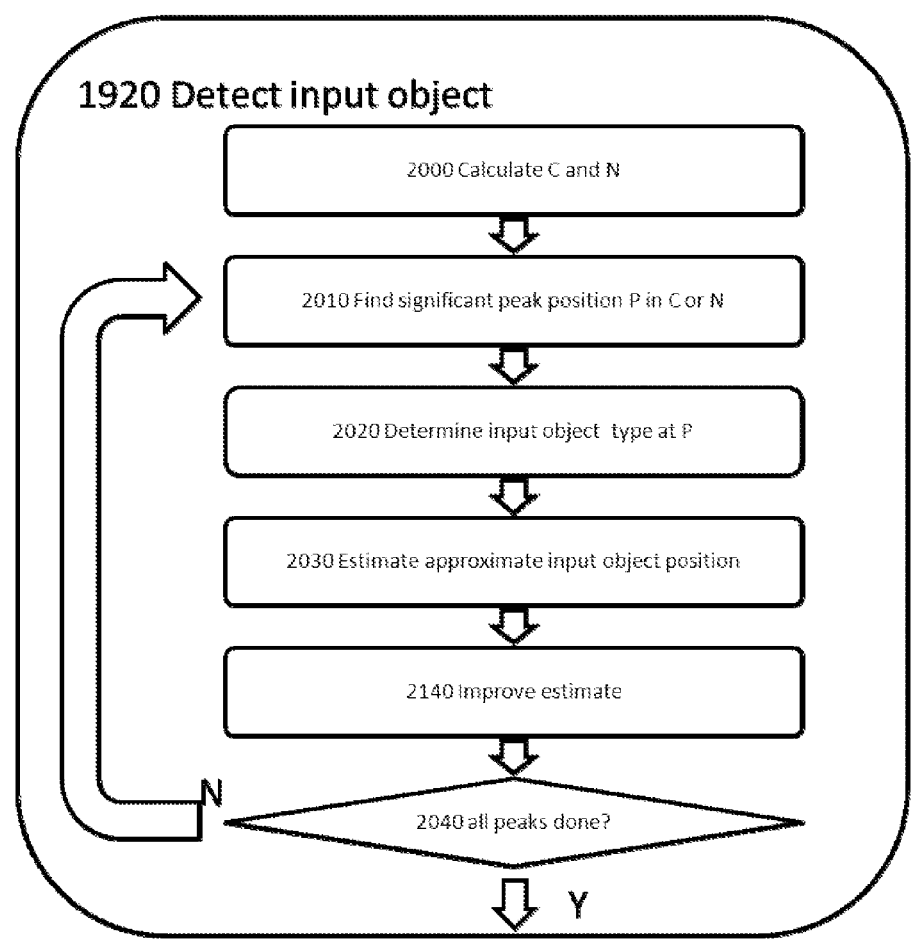
FIG. 21 shows in more detail another method for implementing the input object detection algorithm.

In an eighth embodiment, illustrated in FIG. 21, an extra step 2140 is added to the input object detector 1920 of the previous embodiment to improve the position estimate POS (P) before it is output, as follows. Instead of outputting POS (P) for significant point <P, c, q> instead output $POS_1(P)$ where $POS_1$ is defined as a weighted sum of point positions near to P, weighted by a function of the measured capacitance change in C or N as appropriate. For the example below we take the "near" points of P to be its 8 neighbours $L_8(P)$. More points may be used if the pointing object is expected to be large and if computing resource is sufficient. For the function of measured capacitance a simple exponent power may be used. Here $w_p$, $w_o$ and $w_d$ are weighting factors for neighbours at different distances, $w_e$ is a weighting exponent, and $\Phi$=C if c, N if ~c.

$$POS_1(P) = w_p POS(P) \cdot \Phi(P)^{w_e} + w_o \sum_{p \in N_o(P)} POS(p) \cdot \Phi(p)^{w_e} + w_d \sum_{p \in N_d(P)} POS(p) \cdot \Phi(p)^{w_e}$$

For example, reasonable results can be achieved by choosing $w_e=2$, $w_p=0.6193$, $w_o,=0.0838$ and $w_d=0.0113$ (that is, Gaussian spatial weighting factors).

Figure 22:
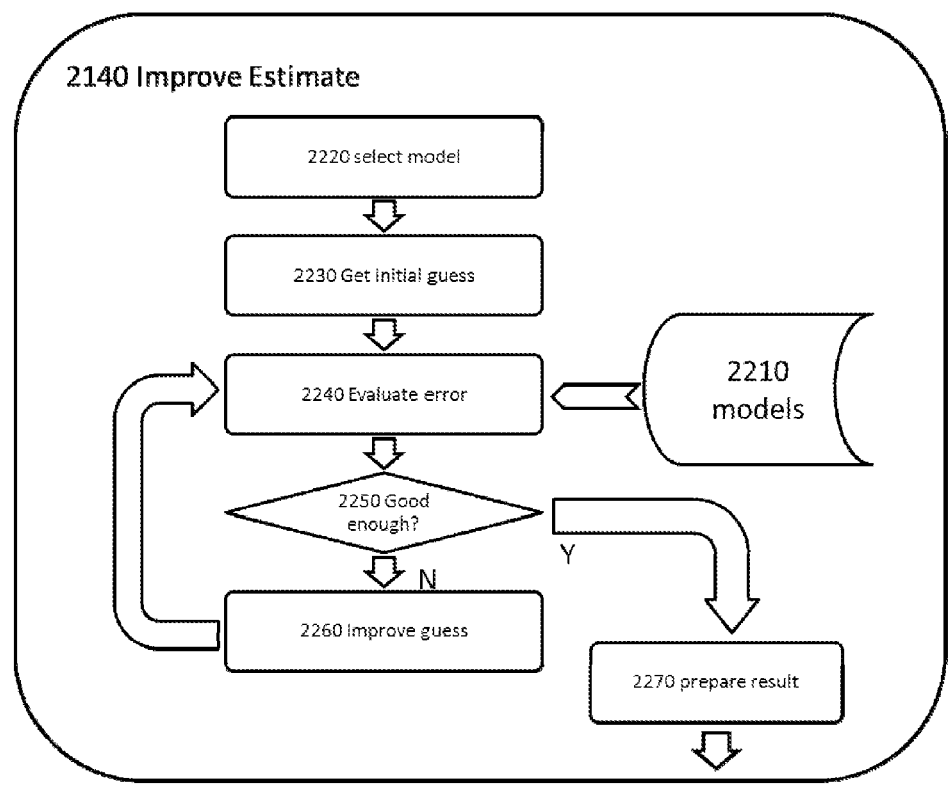
FIG. 22 shows in more detail a method of improving the input object detection algorithm.

In a ninth embodiment, illustrated in FIG. 22, the improve estimate step 2140 of the eighth embodiment is refined by the addition of a model fitting step.

A model M of the calibrated data is defined to be a function of a certain kind: it takes as input a description of an input object and its position relative to an electrode element, and for a given subframe, s, predicts the change in capacitance $\Delta C$ (that is, the calibrated capacitance) that would be measured at the electrode pair corresponding to subframe s, due such an input object at the given position. Thus $$M(s;x,y,z,w,e) = \Delta C$$

where s is the subframe index, (x, y) is the horizontal pixel displacement (which for definiteness and simplicity of explanation is assumed to be in the same axes and units as returned by the POS(P) function), z is the perpendicular height of the input object above the panel, w represents the physical shape of the input object, and e its electrical properties. A model may also predict synthetic subframes (eg N and C or some other arithmetical combination of $F_1 \ldots F_S$) It is necessary to have two models, $M_C$ for conductive input objects and $M_N$ for non-conductive objects.

Good results have been found by choosing w to be the diameter of a circular input object and e to be the conductance to ground for $M_C$ (in the case of a conductive input object) or the average permittivity of the input object for $M_N$ (in the case of a non-conductive input object).

The values, $\Delta C$, returned by a model may be constructed by direct experimental measurement of a number of different input objects at a number of different (known) locations, and using standard interpolation and extrapolation techniques to obtain other values (i.e. those for which an experiment was not performed). For example good results were obtained with this method using measurement data obtained over all combinations of the following ranges of variables:

x and y at spacing of one quarter of the electrode element spacing, starting from the electrode and moving up to seven steps in the positive direction of each of the two axes. It was assumed that since the electrode elements are symmetric in the x and y directions that the measurements for the negative directions would be the same as the positive directions (ie M(s; x, y, z, w, e)=M(s; −x, y, z, w, e)=M(s; x, −y, z, w, e)=M(s; −x, −y, z, w, e) for all valid parameter values.) Thus 49 measurements in x and y for each configuration of s, z, w and e.

z at 26 values from zero (touching the panel) to 24 mm in front of (above) the panel, more closely spaced around zero w at three cylindrical input objects 3 mm, 5 mm and 10 mm in diameter, using either a metal, grounded object (for the conductive model) or a plastic object (for the non-conductive model).

For e it was considered sufficient to assume that each model scales linearly with e:

$$M(s;x,y,z,w,e) = e \cdot M(s;x,y,z,w,1)$$

In addition, the capacitance change is known to fall to zero as the input object moves further from the electrode element, or as the input object size approaches zero. This gives a good boundary condition for extrapolation. Good results were obtained using linear interpolation, though other known methods of interpolation may be equally good.

Alternatively, it would be possible to construct M using other techniques of model building, well known to those skilled in the art (e.g., models based on theoretical calculations). For example, using a finite element simulation model to predict the electrical capacitances for a given input object position, either with or without interpolation. For a further example, the model could be approximated by closed-form equations, or a combination of these techniques.

Next is explained how to use the models $M_C$ and $M_N$ to calculate the input object position, as shown in FIG. 22. The input to the modified Improve Estimate block 2140 is a candidate peak position P=(j, k), the peak type, and the current calibrated data frame F. The appropriate model $M_C$ or $M_N$ 2210 is selected 2220 depending on the peak type, conductive or non-conductive. An initial guess g=(x, y, z, w, e) is made 2230 for parameters of the input object relative to POS(P). The measured values in the frame at and near to P are compared with the predicted values of the selected model M to obtain an error term 2240. If the error is too large the guess is improved 2260 and the process repeats normally until the error is small enough or else the time taken is too long. The guess g=(x, y, z, w, e) giving the smallest error term is assumed to be the correct input object position relative to P, and so the position POS(P)+(x, y) is prepared 2270 as the result of the block. In addition it may be advantageous to return as result some or all of z, w and e. In particular, the judgement of whether the input object is in contact with the panel or not may be obtained by comparing the value of z with a threshold value to be determined by testing the behaviour of the panel with known inputs.

The method of optimising a set of parameters to minimise an error function is well known, and there are many methods for doing this. It will be obvious to those skilled in the art that FIG. 22 represents the outline of just one possible method.

The error function E(F, P, M, g) represents a measure of the difference between the values of a measured frame F near to a detected peak, P, and the model M prediction of those values due to a guessed set of parameters g=(x, y, z, w, e). As usual in these cases, the error function is constructed to be always positive and to have a minimum value of 0 just when the guess is correct (that is, corresponding to the position and parameters of the input object causing the measured frame values). However, due to noise in measurement it is possible that 0 is never achieved; or that the least value of E is achieved for an incorrect guess; or that the guess corresponding to the least value is not found by the minimisation procedure. It is assumed that such errors will be small or negligible by a user of the system. When this method is used the quality Q(P) of the peak may be redefined as some decreasing function of the smallest error term, for example $Q(P)=-E_0$ where $E_0$ is the smallest error found by the minimisation procedure.

Reasonable results were achieved using the following error function E(F, P, M, g). The frame ΔC values at point P and its eight neighbours $L_8(P)$ were used to calculate E. An error weight function $r(s, p) \geq 0$ was chosen, defined for each position $p \in \{(0,0)\} \cup L_8(0,0)$ and each subframe $F_s$ of F. Then define $$E(F, P, M, g) = \sum_{s \in S} \sum_{p \in P \cup L_8(P)} r(s, p-P) \cdot (M(s; p-P-(x,y), z, w, e) - F_s(p_i))^2$$

For definiteness, the weights may be chosen as squared Gaussians, so that r(s, p−P) is 1 at p=P, $0.0838^2$ if $p \in L_o(P)$ and $0.0113^3$ if $p \in L_d(P)$. The general idea is that points nearer to the peak should have more weight. They may also be adjusted so that subframes with higher signal to noise ratio have more weight.

Alternatively, it may be advantageous to reduce the dimensionality of the search by using the structure of M. In particular, since M(s; x, y, z, w, e) is assumed in one model to be a linear function of e, then e can be removed from the search space, and instead calculated as the one giving the least error. To do this, define M'(s; x, y, z, w)=M(s; x, y, z, w, e)/e, and a corresponding E'(F, P, M, g') where g'=(x, y, z, w) by $$E'(F, P, M, g') = \min_{e>0} \sum_{s \in S} \sum_{p \in P \cup L_8(P)} r(s, p) \cdot (e \cdot M'(s; p-P-(x,y), z, w) - F_s(p_i))^2$$

Since the term inside the min is simply a positive quadratic function of e it is simple to solve in closed form for the minimum value. The reduced dimensionality of the search may potentially allow the procedure to be applied using less computational resource.

Figure 23:
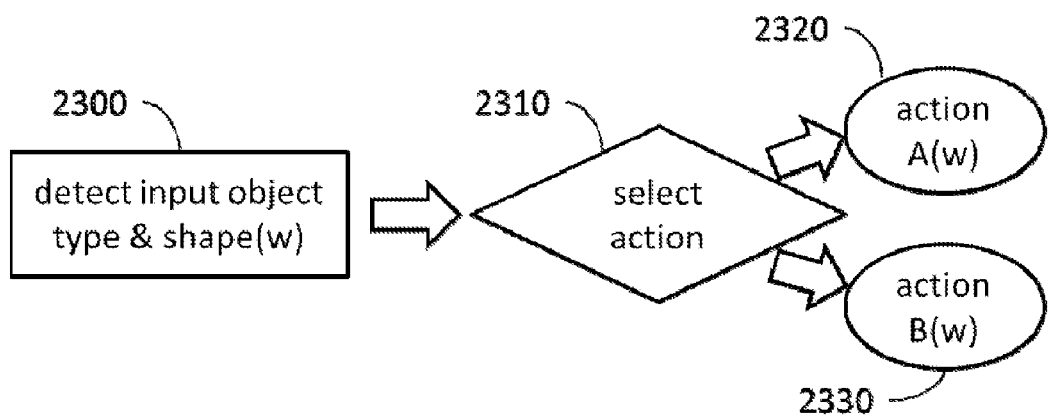
FIG. 23 shows an application of the touch panel device of the present invention in accordance with a tenth embodiment of the invention.

In accordance with a tenth embodiment, and illustrated in FIG. 23, the application or operating system of the device selects an action depending on at least one of the type and the shape of input object detected. In FIG. 23, the system receives input object type and shape 2300 which has been detected in unit 1900. The shape may be described by a parameter, w. The type may be "conductive" or "non-conductive", and this is in addition to any information about the position of the input object or whether the input object is determined to be touching or not touching the panel. The information is used to select 2310 an action. The action may be A 2320 or B 2330 depending on the type, and may additionally be parameterised by w.

Thus for example a drawing program could draw in a first colour when the user touches the panel with a conductive stylus, pencil or finger, and could draw in a second colour when the user touches the panel with a non-conductive stylus. Alternatively, the drawing program could draw when the user touches the panel with a conductive stylus or erase when the user touches the panel with a non-conductive stylus. The non-conductive stylus may be for example a physical eraser such as found on the end of many pencils.

An application or operating system could regard a touch with a conductive stylus as equivalent to a left-mouse-click, and with a non-conductive stylus as a right-mouse-click. Or vice versa.

Using the w parameter from earlier embodiments, the operating system or application could vary or select an action depending on the size or shape of input object as well as or instead of its conductivity. For example the user could draw thin lines using a pencil as a stylus, and thick lines using a finger. Or a touch with the thin stylus could be interpreted as a left click, and with a thick stylus as a right click.

Figure 24:
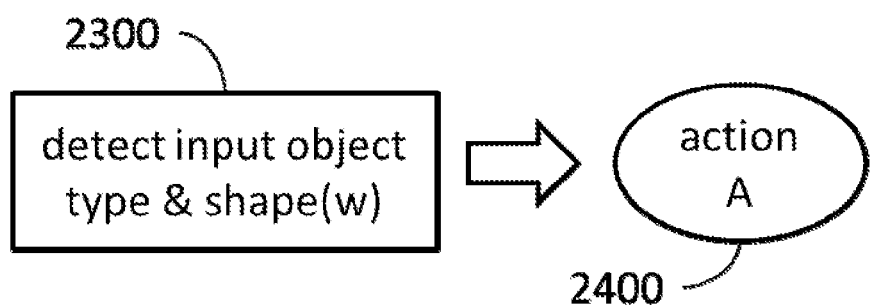
FIG. 24 shows an alternative application of the touch panel device of the present invention in accordance with an eleventh embodiment of the invention.

In accordance with an eleventh embodiment, and illustrated in FIG. 24 the application or operating system of the device selects an action which does not depend on the type of input object detected. In FIG. 24, the system receives input object type and shape 2300 as in FIG. 23. The shape may be described by a parameter, w. The type may be "conductive" or "non-conductive", and this is in addition to any information about the position of the input object or whether the input object is determined to be touching or not touching the panel. An action 2330 is taken which does not depend on the additional information.

Thus, for example, the user may operate the application in a single way, that is with a single kind of touch operation, which does not depend on whether the stylus used is conductive or not; and which would work if the user points with a bare finger or with a gloved finger; and which would work with a thin or fat stylus.

The application or operating system may automatically select between the various modes of interaction described above. Alternatively, the application or operating system of the device may provide a user interface element which allows the user to select between the various interaction modes.

INDUSTRIAL APPLICABILITY

The invention finds application in touch panels and touch-screen devices, for industrial and consumer electronics. It is ideally suited to products such as mobile phones, tablet computers, 'e-readers,' and interactive public information terminals

The invention claimed is:

1. A mutual capacitance touch sensor, comprising:
a substrate;
an array of electrode elements formed on the substrate, each electrode element comprising at least one of a first electrode group comprising at least two drive electrodes and at least one sense electrode, or a second electrode group comprising at least two sense electrodes and at least one drive electrode, wherein the respective electrodes of the first or second group are arranged to form multiple capacitances over different coupling distances; and
a controller operatively coupled to the array of electrode elements, the controller configured to assign an input object as a conductive object according to a first characteristic change of the multiple capacitances as the input object approaches the touch sensor, and assign the input object as non-conductive object according to a second characteristic change of the multiple capacitances different from the first characteristic change as the input object approaches the touch sensor.

2. The touch sensor according to claim 1, wherein the first characteristic change is a decrease in capacitance of the multiple capacitances as the input object approaches the touch sensor, and the second characteristic change is an increase in capacitance of at least one of the multiple capacitances as the input object approaches the touch sensor.

3. The touch sensor according to claim 1, wherein the controller is configured to determine, based on measurements of the multiple capacitances, a location and height of the object relative to a surface of the touch sensor.

4. The touch sensor according to claim 1, wherein the at least two sense electrodes of the second electrode group are arranged as pairs such that two sense electrodes are provided at every row-column intersection in the array.

5. The touch sensor according to claim 4, wherein a first sense electrode of a sense electrode pair is separated from the drive electrode by a shorter distance, in a plane of the sensor substrate, than a second sense electrode of the pair of sense electrodes.

6. The touch sensor according to claim 1, wherein the at least two drive electrodes of the first electrode group are arranged as pairs such that two drive electrodes are provided at every row-column intersection in the array.

7. The touch sensor according to claim 6, wherein a second drive electrode of the pair of drive electrodes is separated from the sense electrode by a greater distance, in a plane of the sensor substrate, than a first drive electrode of the pair of drive electrodes.

8. The touch sensor according to claim 1, wherein the at least two drive electrodes of the first electrode group are arranged as drive electrode pairs and the at least one sense electrode of the first electrode group is arranged as a sense electrode pair such that two drive electrodes and two sense electrodes are provided at every row-column intersection in the array.

9. The touch sensor according to claim 4, wherein a first sense electrode of the sense electrode pair is split into two parts that run adjacent to a side of a second sense electrode of the sense electrode pair.

10. The touch sensor according to claim 6, wherein a first drive electrode of the drive electrode pair is split into two parts that run adjacent to a side of a second drive electrode of the drive electrode pair.

11. The touch sensor according to claim 1, wherein the sense electrodes of the second electrode group are arranged as a plurality of sense electrode pairs, each pair including a first dual-function sense electrode and a second dual-function sense electrode, and the at least one drive electrode comprises a pair of drive electrodes, or wherein
the drive electrodes of the first electrode group are arranged as a plurality of drive electrode pairs, and the at least one sense electrode comprises a pair of sense electrodes, each pair including a first dual-function sense electrode and a second dual-function sense electrode.

12. The touch sensor according to claim 11 wherein
the sense electrode pairs are divided into odd numbered sense electrode pairs and even numbered sense electrodes pairs, and the drive electrode pairs are divided into odd numbered drive electrode pairs and even numbered drive electrodes pairs,
a majority of the first odd numbered dual function sense electrodes of a pair of sense electrodes are adjacent the first odd numbered dual-function drive electrodes of a pair of drive electrodes, and a majority of the second odd numbered dual-function sense electrodes of the pair of sense electrodes are adjacent the first even numbered dual-function drive electrodes of the pair of drive electrodes, and
a majority of the second even numbered dual-function sense electrodes of a pair of sense electrodes are adjacent the second even numbered dual function drive electrodes of a pair of drive electrodes, and a majority of the second odd numbered dual-function sense electrodes of the pair of sense electrodes are adjacent the first even numbered dual-function drive electrodes of the pair of drive electrodes.

13. The touch sensor according to claim 11, wherein
the sense electrode pairs are divided into odd numbered sense electrode pairs and even numbered sense electrodes pairs, and the drive electrode pairs are divided into odd numbered drive electrode pairs and even numbered drive electrodes pairs,
a majority of the first odd numbered dual function sense electrodes of a pair of sense electrodes are adjacent the first odd numbered dual-function drive electrodes of a pair of drive electrodes, and a majority of the second odd numbered dual-function sense electrodes of the pair of sense electrodes are adjacent the first even numbered dual-function drive electrodes of the pair of drive electrodes, and
a majority of the first even numbered dual-function sense electrodes of a pair of sense electrodes are adjacent the second odd numbered dual function drive electrodes of a pair of drive electrodes, and a majority of the second even numbered dual-function sense electrodes of the pair of sense electrodes are adjacent the first even numbered dual-function drive electrodes of the pair of drive electrodes.

14. The touch sensor according to claim 11, wherein sense electrode pairs are formed in a first transparent conductive layer and drive electrode pairs are formed in a second transparent conductive layer, the first and second transparent conductive layers separated by an insulating layer.

15. The touch sensor according to claim 14, wherein
the sense electrode pairs are divided into odd numbered sense electrode pairs and even numbered sense electrodes pairs, and the drive electrode pairs are divided into odd numbered drive electrode pairs and even numbered drive electrodes pairs,
a majority of the first odd numbered dual function sense electrodes of a pair of sense electrodes are adjacent the first odd numbered dual-function drive electrodes of a pair of drive electrodes, and a majority of the second odd numbered dual-function sense electrodes of the pair of sense electrodes are adjacent the first even numbered dual-function drive electrodes of the pair of drive electrodes, and
a majority of the first even numbered dual-function sense electrodes of a pair of sense electrodes are adjacent the second odd numbered dual function drive electrodes of a pair of drive electrodes, and a majority of the second even numbered dual-function sense electrodes of the pair of sense electrodes are adjacent the second even numbered dual-function drive electrodes of the pair of drive electrodes.

16. The touch sensor according to claim 1, wherein the controller is configured to select an action based on the determined type of the input object.

17. A method for determining the presence, type or position of at least one input object relative to a touch panel, wherein a controller circuit provides capacitance measurements from the touch panel, the method comprising:
inputting capacitance measurement data from the controller circuit into a data frame;
calibrating the data frame such that data represented therein corresponds to a change in capacitance relative to a state when the at least one input object is not present;
analysing the data in the data frame to determine if the at least one input object is within a detection range of the touch panel; and
when the at least one input object is within the detection range of the touch panel, determining a type and position of the at least one input object based on the data in the data frame.

18. The method according to claim 17, wherein determining a type and position of the at least one input object comprises:
computing first and second synthetic subframes based on a combination of calibrated subframes;
analysing the first and second synthetic subframes to determine a significant peak position in at least one of the first or second synthetic subframe;
determining the type of the at least one input object at the determined significant peak position based on a change in at least one of the first or second synthetic subframes; and
estimating the location of the at least one input object from the significant peak position.

19. The method according to claim 18, wherein the synthetic subframes are obtained by low-pass filtering a weighted sum of calibrated subframes.

20. The method according to claim 18, further comprising estimating a location of the at least one input object as $POS_1(P)$, where P is the significant peak position and $POS_1$ is defined as a sum of point positions near P and weighted by a measured capacitance change in the first or second synthetic subframes.

21. The method according to claim 20, wherein estimating includes defining a model of the calibrated data frame, the model describing an input object and a corresponding position of the input object relative to an electrode element, and for a given subframe the model operative to predict a change in capacitance that would be measured at the electrode element corresponding to the subframe due to the at least one input object being at the corresponding position.

22. The method according to claim 17, further comprising selecting an action based on the determined type of the at least one input object.

23. The method according to claim 17, further comprising selecting an action independent of the determined type of the at least one input object.

* * * * *